US012647935B2

(12) United States Patent　　　　(10) Patent No.:　US 12,647,935 B2

Hashimoto et al.　　　　　　　　　(45) Date of Patent:　　　Jun. 2, 2026

(54) POSITION ESTIMATION SYSTEM, INFORMATION TERMINAL USED FOR SAME, AND POSITION ESTIMATION METHOD

(71) Applicant: MAXELL, Ltd., Kyoto (JP)

(72) Inventors: Yasunobu Hashimoto, Otokuni-gun (JP); Hideyuki Kuwajima, Otokuni-gun (JP); Nobutaka Okuyama, Otokuni-gun (JP); Hitoshi Akiyama, Otokuni-gun (JP); Susumu Yoshida, Otokuni-gun (JP)

(73) Assignee: Maxell, Ltd., Kyoto (JP)

( * ) Notice: Subject to any disclaimer, the term of this patent is extended or adjusted under 35 U.S.C. 154(b) by 414 days.

(21) Appl. No.: 18/018,800

(22) PCT Filed: Jul. 31, 2020

(86) PCT No.: PCT/JP2020/029459

§ 371 (c)(1),
(2) Date: Jan. 30, 2023

(87) PCT Pub. No.: WO2022/024351

PCT Pub. Date: Feb. 3, 2022

(65) Prior Publication Data

US 2023/0309057 A1　　　Sep. 28, 2023

(51) Int. Cl.
H04W 64/00　　　　(2009.01)
H04W 72/563　　　(2023.01)

(52) U.S. Cl.
CPC ....... H04W 64/006 (2013.01); H04W 72/563 (2023.01)

(58) Field of Classification Search
CPC ..... H04W 64/00; H04W 4/023; H04W 4/029; H04W 4/80; H04W 4/02; H04W 64/003;
(Continued)

(56) References Cited

U.S. PATENT DOCUMENTS

2004/0203872 A1* 10/2004 Bajikar ................. H04W 64/00
　　　　　　　　　　　　　　　　　　　455/67.11
2007/0038772 A1 　 2/2007 Obata
(Continued)

FOREIGN PATENT DOCUMENTS

JP　　　2002-092792 A　　3/2002
JP　　　2005-035185 A　　2/2005
(Continued)

OTHER PUBLICATIONS

Notice of Reasons for Refusal received in corresponding Japanese Patent Application No. 2022-539948, dated Feb. 13, 2024.
(Continued)

*Primary Examiner* — Kwasi Karikari
(74) *Attorney, Agent, or Firm* — Rimon P.C.

(57)　　　　　　　　ABSTRACT

A position estimation system uses an information terminal and has an improved position accuracy. To achieve the purpose, this position estimation system is provided with a first information terminal having a function to transmit a wireless signal associated with identification information and a second information terminal having a function to measure a reception intensity of the wireless signal, and is configured in such a way that: the reception intensity of the wireless signal transmitted by the first information terminal is measured by the second information terminal; at least one of the first information terminal and the second information terminal measures a movement distance; and at least one of the first information terminal and the second information terminal estimates a relative positional relationship between the first information terminal and the second information terminal from a change in the reception intensity of the wireless signal with respect to the movement distance.

20 Claims, 30 Drawing Sheets

(58) Field of Classification Search
CPC ..... H04W 64/006; H04W 4/40; H04W 4/025;
H04W 24/08; H04W 24/10; H04W 4/027;
H04W 8/005; H04W 4/70; H04W 4/024;
H04W 88/02; H04W 12/63; H04W 48/04;
H04W 4/026; H04W 72/542; H04W
40/20; H04W 84/005; H04W 4/48; H04W
52/283; H04W 36/322; H04W 4/42;
H04W 4/46; H04W 36/324; H04W 36/30;
H04W 28/0226; H04W 52/282; H04W
52/265
See application file for complete search history.

(56)                References Cited

U.S. PATENT DOCUMENTS

| | | |
|---|---|---|
| 2010/0214086 A1 | 8/2010 | Yoshizawa et al. |
| 2018/0053412 A1 | 2/2018 | Iagnemma et al. |
| 2018/0059240 A1 | 3/2018 | Kawanishi et al. |
| 2019/0331503 A1 | 10/2019 | Yoneda et al. |
| 2020/0310461 A1* | 10/2020 | Kaufman ............. G05D 1/0276 |
| 2021/0255634 A1* | 8/2021 | Mancilla ............... H04W 4/023 |

FOREIGN PATENT DOCUMENTS

| | | |
|---|---|---|
| JP | 2005-332143 A | 12/2005 |
| JP | 2007-049513 A | 2/2007 |
| JP | 2015-108871 A | 6/2015 |
| JP | 2017-211954 A | 11/2017 |
| JP | 2018-036920 A | 3/2018 |
| JP | 2019016150 A | 1/2019 |
| JP | 2019-530937 A | 10/2019 |
| JP | 2019191914 A | 10/2019 |
| JP | 2019-194836 A | 11/2019 |
| WO | 2010/035434 A1 | 4/2010 |

OTHER PUBLICATIONS

International Search Report issued in corresponding International
Patent Application No. PCT/JP2020/029459, dated Oct. 13, 2020,
with English translation.

* cited by examiner

100

1B

1A

1C

1D

2

SERVER
CLOUD SERVER
EDGE SERVER

9

FIG. 3A
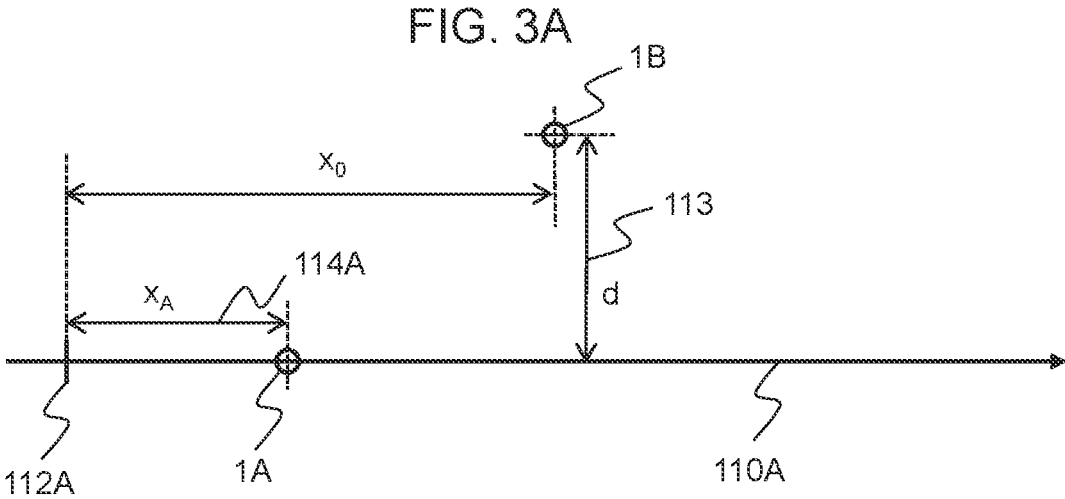
FIG. 3B
FIG. 3C
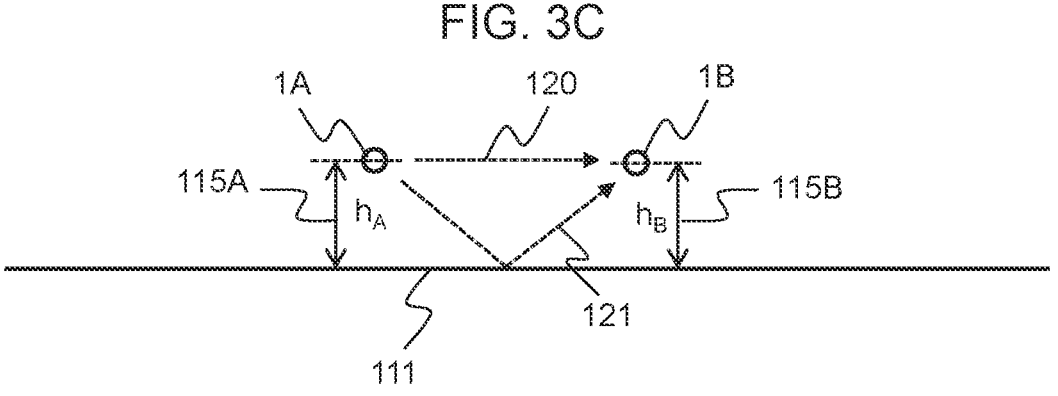

| MEASUREMENT TIME | RECEPTION INTENSITY |
|---|---|
| 12:00:00.0 | 0.01 |
| 12:00:00.2 | 0.02 |
| 12:00:00.4 | 0.03 |
| 12:00:00.6 | 0.05 |
| 12:00:00.8 | 0.07 |
| 12:00:01.0 | 0.10 |

FIG. 10B

| MEASUREMENT TIME | MOVEMENT DISTANCE |
|---|---|
| 12:00:00.0 | 0.0 |
| 12:00:00.2 | 2.4 |
| 12:00:00.5 | 4.8 |
| 12:00:00.7 | 6.5 |
| 12:00:00.9 | 8.1 |
| 12:00:01.1 | 9.6 |

FIG. 10C

| RELATIVE MOVEMENT DISTANCE | RECEPTION INTENSITY |
|---|---|
| 0.0 | 0.01 |
| 2.4 | 0.02 |
| 4.8 | 0.04 |
| 6.5 | 0.06 |
| 8.1 | 0.08 |
| 9.6 | 0.11 |

FIG. 10D

| RELATIVE MOVEMENT DISTANCE | ESTIMATED VALUE |
|---|---|
| 0.0 | - |
| 2.0 | - |
| 4.8 | 103 |
| 6.5 | 62 |
| 8.1 | 87 |
| 9.6 | 42 |

601 — 30m AWAY FROM PASSENGER

600

602

603 — PASSENGER IS IN VICINITY OF THIS LINE

600

604

605 — THIS PASSENGER IS ASSUMED AS TARGET

| AMOUNT OF WALL OF BUILDING | FITTING FUNCTION |
|---|---|
| PREDETERMINED AMOUNT OR LESS | $L_0$ TYPE |
| GREATER THAN PREDETERMINED AMOUNT | $L_1$ TYPE |

FIG. 17B

| DISTANCE TO MEETING SPOT | FITTING FUNCTION |
|---|---|
| GREATER THAN PREDETERMINED DISTANCE | $L_0$ TYPE |
| PREDETERMINED DISTANCE OR LESS | $L_1$ TYPE |

FIG. 17C

| AMOUNT OF WALL OF BUILDING | PREDETERMINED DISTANCE |
|---|---|
| PREDETERMINED AMOUNT OR LESS | $T_{P1}$ |
| GREATER THAN PREDETERMINED AMOUNT | $T_{P2}$ |

(a)

(b)

(c)

(d)

1D

| CHANGE IN RECEPTION INTENSITY | VIBRATION PATTERN |
|---|---|
| REACH RECEIVABLE LEVEL | ONE TIME |
| REACH RECEPTION INTENSITY LEVEL 1 | TWO TIMES |
| REACH RECEPTION INTENSITY LEVEL 2 | THREE TIMES |
| REACH RECEPTION INTENSITY LEVEL 3 | FOUR TIMES |

2040 2021b 2021a

1C

2052a

2052b

2051a

2060

2051b 2200 600

POSITION ESTIMATION SYSTEM, INFORMATION TERMINAL USED FOR SAME, AND POSITION ESTIMATION METHOD

CROSS-REFERENCE OF RELATED APPLICATION

This application is the U.S. National Phase under 35 U.S.C. § 371 of International Patent Application No. PCT/JP2020/029459, filed on Jul. 31, 2020, the entire disclosure of which Application is incorporated by reference herein.

TECHNICAL FIELD

The present invention relates to a position estimation system using an information terminal.

BACKGROUND ART

There is Patent Document 1 as the background art of the technical field relevant to the acquisition of position information. In Patent Document 1, the position of a user is subjected to positioning with a global positioning system (GPS), or the position is estimated from the position of an access point of a vicinally installed wireless local area network (LAN).

CITATION LIST

Patent Document

Patent Document 1: JP 2005-351859 A

SUMMARY OF THE INVENTION

Problems to be Solved by the Invention

In a position estimation method of Patent Document 1, a sufficient accuracy may not be obtained in the position estimation. For example, there is a case where a GPS electrical wave is disturbed by a reflection on a building or a case where the GPS electrical wave is not capable of being received in the building, a case where the user is distant from the access point of the wireless LAN, a case where an electrical wave of the access point of the wireless LAN is not capable of being received, or the like. As a case and the like where a high position estimation accuracy is desired, there is a case where the appearance of the opposition is unknown and there are a plurality of potential people or cars, for example, such as the case of calling a taxi in an area with heavy traffic of people and cars.

In consideration of the problems described above, an object of the present invention is to provide a position estimation system that uses an information terminal and has an improved position accuracy.

Solutions to Problems

According to an example of the present invention, a position estimation system is provided with a first information terminal having a function to transmit a wireless signal associated with identification information and a second information terminal having a function to measure a reception intensity of the wireless signal, and is configured in such a way that: the reception intensity of the wireless signal transmitted by the first information terminal is measured by the second information terminal; at least one of the first information terminal and the second information terminal measures a movement distance; and at least one of the first information terminal and the second information terminal estimates a relative positional relationship between first information terminal and the second information terminal from a change in the reception intensity of the wireless signal with respect to the movement distance.

Effects of the Invention

According to the present invention, it is possible to provide the position estimation system that uses the information terminal and has the improved position accuracy.

BRIEF DESCRIPTION OF THE DRAWINGS

FIG. 3A is a diagram illustrating a positional relationship between an information terminal 1A and an information terminal 1B in a case where the information terminal 1B is not moved in Example 1.

FIG. 3B is a diagram illustrating a positional relationship between the information terminal 1A and the information terminal 1B in a case where the information terminal 1B is also moved in Example 1.

FIG. 3C is a projection view in which each element is projected in a direction of a movement line 110A on a perpendicular surface orthogonal to the movement line 110A in FIG. 3A and FIG. 3B.

FIG. 7 is an appearance configuration example of a HMD as an example of the information terminal in Example 1.

FIG. 10A is a diagram illustrating internal data in which the reception intensity with respect to a measurement time is recorded in Example 1.

FIG. 10B is a diagram illustrating internal data in which a movement distance with respect to the measurement time is recorded in Example 1.

FIG. 10C is a diagram illustrating internal data in which the reception intensity with respect to the relative movement distance is recorded in Example 1.

FIG. 10D is a diagram illustrating internal data in which the estimated value of the nearest movement distance with respect to the relative movement distance is recorded in Example 1.

FIG. 17A is an explanatory diagram in which a fitting function is switched in accordance with the amount of wall of the building in Example 4.

FIG. 17B is an explanatory diagram in which the fitting function is switched in accordance with a distance to a meeting spot in Example 4.

FIG. 17C is an explanatory diagram in which a predetermined distance $T_P$ for switching the fitting function, in accordance with the amount of wall of the building, is switched in Example 4.

MODE FOR CARRYING OUT THE INVENTION

Hereinafter, Examples of the present invention will be described by using the drawings.

Example 1

In this example, an example of a case where meeting support for checking each other is performed when a passenger calls a taxi will be described as a position estimation system. Note that, in the following description, an information terminal may be simply described as a terminal. In addition, the meeting support may be simply described as support.

Figure 1:
FIG. 1 is a schematic configuration diagram of a position estimation system in Example 1.

FIG. 1 is a schematic configuration diagram of the position estimation system in this example. In FIG. 1, an information terminal 1A on a car side includes a wireless signal source associated with identification information.

Note that, the car itself may be the information terminal 1A, or the information terminal 1A may be mounted on the car.

The passenger, for example, includes at least one of an information terminal 1B that is a head mount display (HMD), an information terminal 1C that is a smart phone, and an information terminal 1D that is a smart watch, as the information terminal. The following operation of a passenger side terminal may be performed by the terminal alone, or may be performed in cooperation. Here, an example will be described in which the information terminal 1B that is the HMD is operated alone as the passenger side terminal. In addition, the information terminals 1A to 1D will be collectively described as an information terminal 1.

A server 2 performs the processing of each information terminal 1 through a communication network 9, mediates the transmission and reception of information with respect to each information terminal 1, or provides required information. The server 2, for example, is a local server, a cloud server, an edge server, an internet service, and the like, and the form thereof is not limited.

Figure 2:
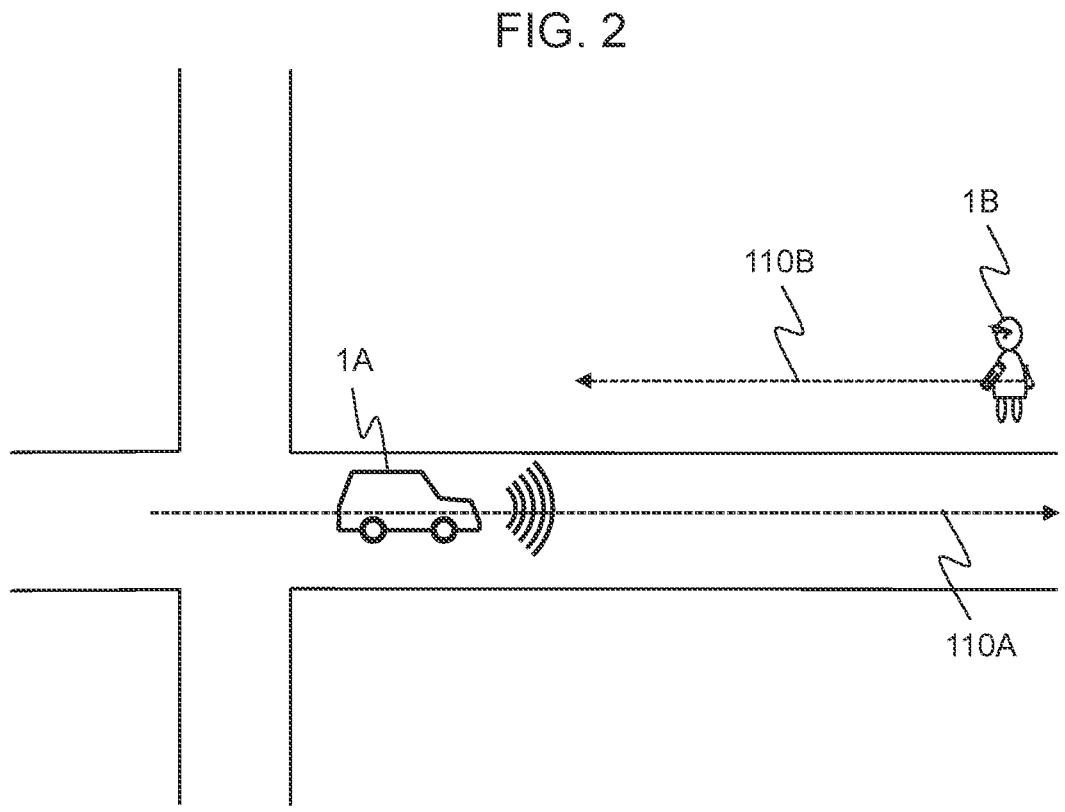
FIG. 2 is a diagram illustrating a meeting support operation in a condition where a passenger is waiting for a car such as a taxi on the side of a road in Example 1.

FIG. 2 is a diagram illustrating a meeting support operation in a condition where the passenger is waiting for a car such as a taxi on the side of a road in this example. In FIG. 2, the information terminal 1A is the car itself, or an information terminal that is mounted on the car. The information terminal 1A is moved along a movement line 110A in the road, and approaches the information terminal 1B of the passenger. Here, the movement line 110A is a trajectory that was traced by the information terminal 1A in the past, and a trajectory to be traced in the future. For the description, the passenger is described as standing still, but a general case where the passenger is moving along a movement line 110B on the side of the road will also be described below.

The information terminal 1A continuously transmits the wireless signal associated with the identification information while being moved. Here, the wireless signal associated with the identification information may be a wireless signal that can be directly transmitted and received without using a repeater or the like, and can be identified. For example, the identification information is a beacon signal, or a signal of Bluetooth (Registered Trademark), Bluetooth low energy (BLE), WiFi (Registered Trademark), point to point communication of local 5G, or the like. In addition, communication between the information terminals 1 may be performed by using the wireless signal.

The information terminal 1 that is moved measures the position of the own terminal. The measurement may be performed by a positioning system using an electrical wave of a GPS or the like, a positioning system based on a position reference point, or an integration of the output of an acceleration sensor. A position may be recorded as a movement distance for each time from an origination suitably set. In addition, a speed can also be calculated from data of the movement distance for each time. Hereinafter, the position of the information terminal 1A will be expressed by the movement distance from the origination. Information of the position is provided to the information terminal 1B from the information terminal 1A in the case of being used in the other information terminal 1B. On the other hand, the information terminal 1B receives the wireless signal, and measures a reception intensity.

Note that, in a case where both of the information terminals 1 are moved, a change in a relative movement distance from the both of the movement distances is used. In addition, either information terminal may be on a transmission side of the wireless signal. Further, both of the information terminals may transmit or receive the wireless signal.

FIG. 3A is a diagram illustrating a positional relationship between the information terminal 1A and the information terminal 1B in a case where the information terminal 1B is not moved in this example. FIG. 3A is a projection view in which each element is projected in a direction vertical to a horizontal surface, and hereinafter, unless otherwise specified, the case of expressing as the projection view on the horizontal surface indicates a diagram in which each element is projected in the vertical direction. In addition, for the symbol of each element, the same symbol as the symbol before the projection on the projection view may be used. In addition, the movement lines 110A and 110B are approximated by a straight line. In addition, only the position of the information terminals 1A and 1B is represented.

In FIG. 3A, a movement distance 114A of the information terminal 1A from an origination 112A is represented by $x_A$. The origination 112A may be arbitrarily set. For example, the position of the information terminal 1A at a point when communication between the information terminal 1A and the information terminal 1B starts at the time of meeting each other is set to the origination 112A. Even in a case where a spot that has not been actually visited is set to the origination 112A, here, it is expressed as the movement distance 114A from the origination 112A.

In addition, a distance (the nearest movement distance) to be moved from the origination until the information terminal 1A reaches a position (the nearest position) nearest to the information terminal 1B on the movement line 110A is set to $x_0$. From data of the reception intensity of the wireless signal with respect to the movement distance, the nearest position is assumed before reaching the nearest position (the details will be described below). In addition, a distance 113 between the information terminal 1B and the movement line 110A is represented by d.

FIG. 3B is a diagram illustrating a positional relationship between the information terminal 1A and the information terminal 1B in a case where the information terminal 1B is also moved in this example, and is the projection view on the horizontal surface, as with FIG. 3A.

In FIG. 3B, the information terminal 1B is moved along the movement line 110B in a direction approaching the information terminal 1A. A movement distance 114B of the information terminal 1B along the movement line 110B from an origination 112B that is arbitrarily set is represented by $x_B$. The movement line 110A and the movement line 110B are approximated to be parallel. A distance between the origination 112A and the origination 112B is the nearest movement distance $x_0$. Note that, here, the movement distance is an amount used for representing a distance from the origination, and is not necessarily coincident with the distance in which the information terminal 1 is actually moved while the meeting support operation is executed, in accordance with the definition of the origination.

FIG. 3C is a projection view in which each element is projected in the direction of the movement line 110A on a perpendicular surface orthogonal to the movement line 110A in FIG. 3A and FIG. 3B. Hereinafter, unless otherwise specified, the case of expressing as the projection view on the perpendicular surface orthogonal to the movement line indicates a diagram in which each element is projected in the movement line direction. This drawing is common to a case where the information terminal 1B is moved and a case where the information terminal 1B is not moved. An earth surface 111 is approximated by a horizontal surface. A distance 115A between the information terminal 1A and the earth surface 111 is represented by $h_A$, and a distance 115B between the information terminal 1B and the earth surface 111 is represented by $h_B$.

In the following discussion, the information terminal 1B is also generally moved. A relative movement distance x is defined by Expression (1) described below, and the profile of the received signal intensity with respect to the relative movement distance is considered.

$$x = x_A + x_B \tag{1}$$

A case where the information terminal 1B is not moved may be considered as $x_B = 0$.

In addition, in FIG. 3C, 120 represents the path of a direct wave of the wireless signal, and 121 represents the path of a reflective wave that is reflected on the earth surface 111. The wireless signal to be received also includes a signal reflected on the earth or a building in the vicinity of the earth, and first, the profile of the reception intensity not including the reflective wave is considered.

A reception intensity $P_0$ of the wireless signal (the direct wave) in a case where there is no reflection is inversely proportional to the square of a distance between a transmission source (the information terminal 1A) and a receiver (the information terminal 1B), and thus, is represented by Expression (2) described below.

$$P_0 = k_0 / \{ (x - x_0)^2 + g_0^2 \} \tag{2}$$

Here, $k_0$ is a constant number depending on the intensity of the signal source and the sensitivity of the receiver, and $g_0$ is defined by Expression (3) described below.

$$g_0 = \{ d^2 + (h_B - h_B)^2 \}^{1/2} \tag{3}$$

$g_0$ is the nearest distance in the direct wave path 120.

Figure 4A:
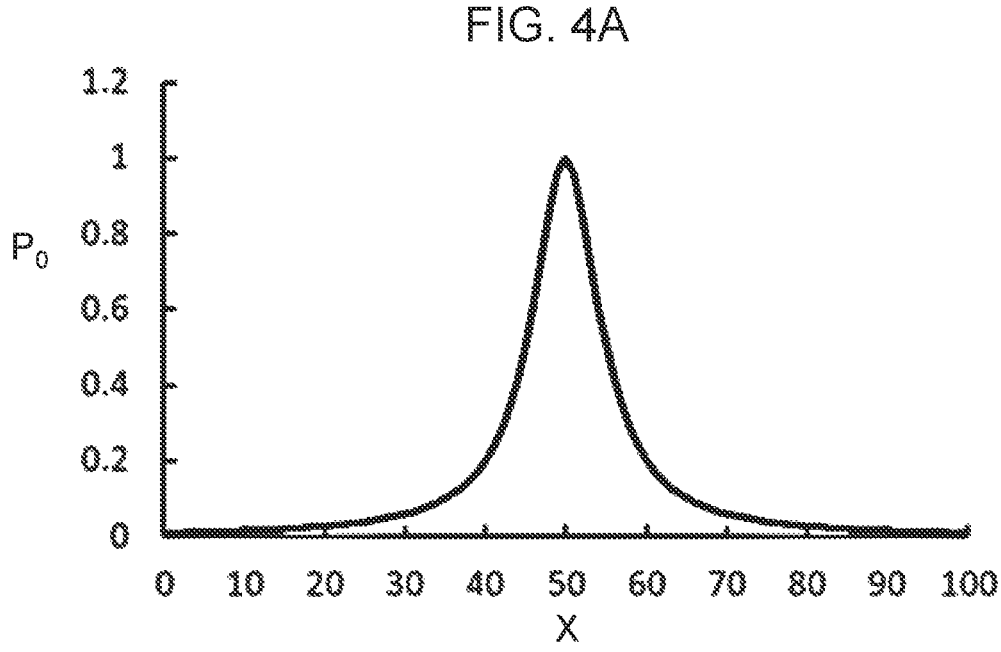
FIG. 4A is a profile of a reception intensity $P_0$ in a case where there is no reflection with respect to a relative movement distance x in Example 1.

For example, the profile of $P_0$ when $h_A$ and $h_B$ are identical to each other, d is 5 m, and $x_0$ is 50 m is as illustrated in FIG. 4A. $g_0$ is 5 m. Here, normalization is performed such that $P_0=1$ is set at the nearest position ($x=x_0$). As seen from FIG. 4A, $P_0$ is a profile having a sharp peak at the nearest position.

Since there is actually a component that is reflected on the earth surface 111 or the building in the vicinity of the earth surface, the profile of the reception intensity is different from $P_0$. A position at which the reception intensity of the component that is reflected is maximized depends on the position of a reflector, and on average, can be expected to be in the vicinity of the nearest position. In addition, since the path of the reflective wave is longer than the direct wave path 120, in the case of also considering the reflective wave, a profile is set in which the nearest distance is effectively increased. Accordingly, the reception intensity profile also including the reflective wave is also described by being approximated by Expression (4) described below.

$$P = k / \{ (x - x_0)^2 + g^2 \} \tag{4}$$

Here, k is a constant number depending on the intensity of the signal source and the sensitivity of the receiver, and g is an effective nearest distance. In a case where the effective nearest distance is the nearest distance of the reflective wave path 121 reflected on the earth surface 111 on which the intensity of the reflective wave is maximized, Expression (5) described below is set.

$$g = \{ d^2 + (h_A + h_B)^2 \}^{1/2} \tag{5}$$

Here, in the case of d=5 m and $h_A=h_B=1.6$ m, g=5.9 m is set, and in this case, the nearest distance is not significantly different from the nearest distance in the direct wave. The value of g is obtained as an estimated value (described below), and may be used as an approximation value of d or $g_0$.

Figure 4B:
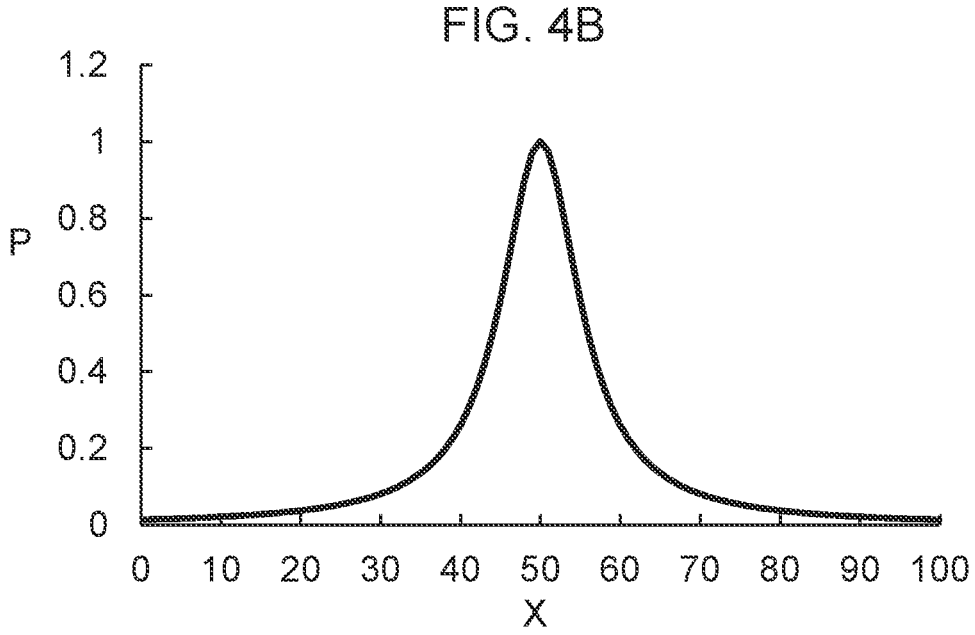
FIG. 4B is a profile of a reception intensity P also including a reflective wave with respect to the relative movement distance x in Example 1.

FIG. 4B is the profile of Expression (4). There is no significant difference in the profile, compared to FIG. 4A. Accordingly, approximation for replacing the nearest distance with an effective distance in a function form of the direct wave is considered to be appropriate as the profile of the actual reception intensity.

Next, a position estimation method will be described on the premise of the reception intensity profile in FIG. 4B. Accordingly, the parameters in Expression (4) are estimated from a measured value of the reception intensity in the middle of approaching the nearest position by parameter fitting of a least squares method or the like. As an example, since the inverse of the reception intensity is a quadratic function relevant to the relative movement distance x, fitting is performed with this function.

$$1/P = (1/k) \{ (x - x_0)^2 + (Ax^2) \} = Bx + C \tag{6}$$

Expression (6) is linear for parameters A, B, and C, and is obtained from the reception intensity data by a least squares method. Here, when performing the calculation with the least squares method, weighted processing may be performed by setting a measurement error of the reception intensity P to be constant and an error of 1/P to be proportional to $P^{-2}$. Accordingly, the estimated value of each parameter in Expression (4) is obtained as follows.

$$k = 1/A \tag{7}$$

$$x_0 = -B/(2A) \tag{8}$$

$$g = (4AC - B^2)^{1/2}/(2A) \tag{9}$$

Note that, a parameter fitting method is not limited to the method described above.

The value of the parameters k, $x_0$, and g is updated every time when measurement data of the reception intensity is added while being moved, and an error due to a noise is reduced.

Figure 5A:
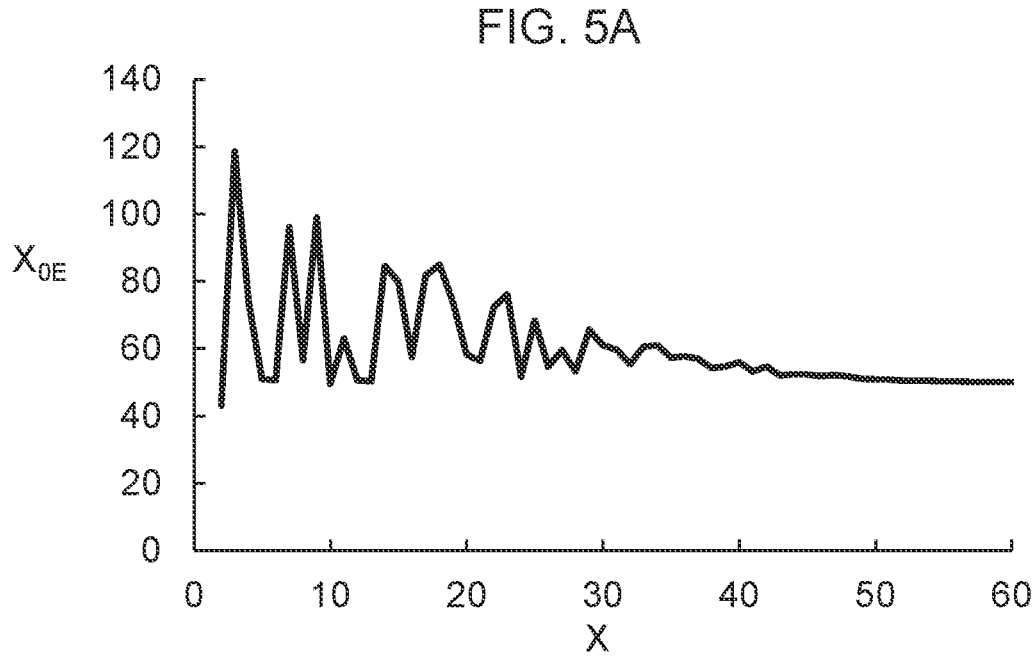
FIG. 5A is a diagram illustrating a state of a change in an estimated value $x_{OE}$ of the nearest movement distance in Example 1.
Figure 5B:
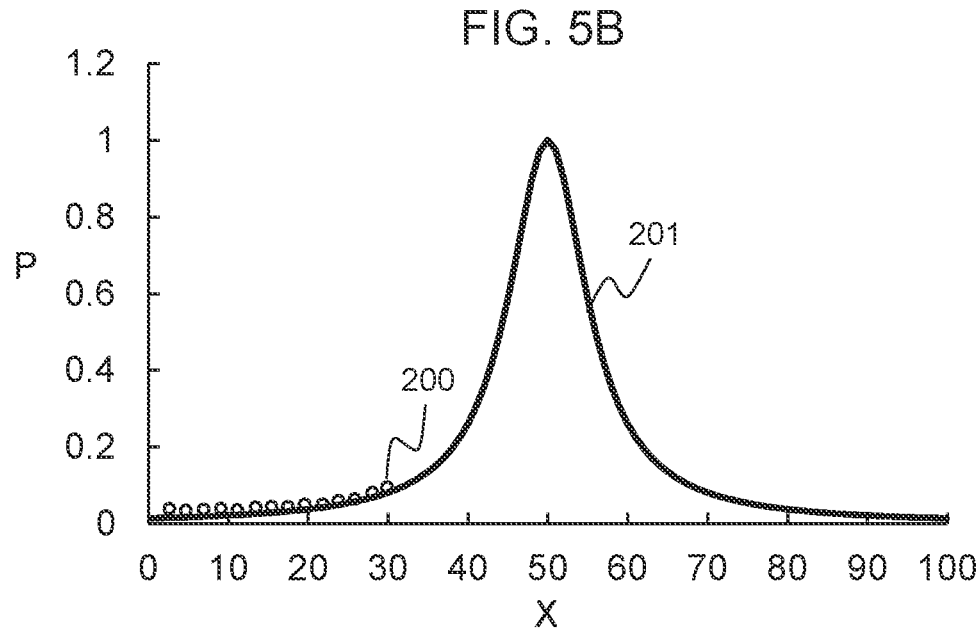
FIG. 5B is a diagram illustrating a measured value of the reception intensity P also including the reflective wave with respect to the relative movement distance x in Example 1.

The estimated value of the nearest movement distance $x_0$ is changed to $x_{0E}$, and the state of a change in $x_{0E}$ is illustrated in FIG. 5A. FIG. 5B represents a measured value 200 of the reception intensity and a reception intensity profile 201 estimated by fitting. For example, the point of x=30 m in the graph of FIG. 5A represents the value of $x_{0E}$ estimated from the measured value of the reception intensity P up to x=30 m illustrated in FIG. 5B. In the estimation, it is not necessary to use all the measured values of the past. The measured value with a large error at the start of the measurement may not be used for estimating $x_{0E}$ at a point where the accumulation of the measured values with a small error is increased as approaching the nearest position.

While a noise influence on the estimated value $x_{OE}$ from the reception intensity is large, the speed of the car is controlled aiming at an area that is designated at the time of reservation. After the noise influence on the estimated value $x_{OE}$ is decreased as approaching the nearest position, the speed of the car is controlled aiming at stopping at the nearest position to the passenger. The car may be controlled by a driver, or by an automated driving device.

Figure 6A:
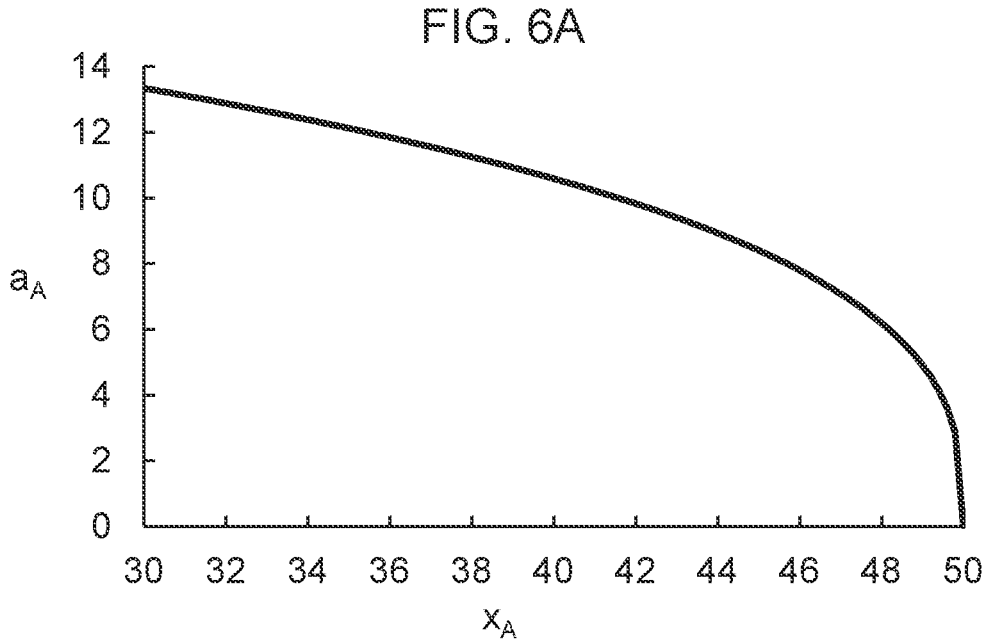
FIG. 6A is a diagram illustrating a control example of an acceleration change with respect to position information in Example 1.
Figure 6B:
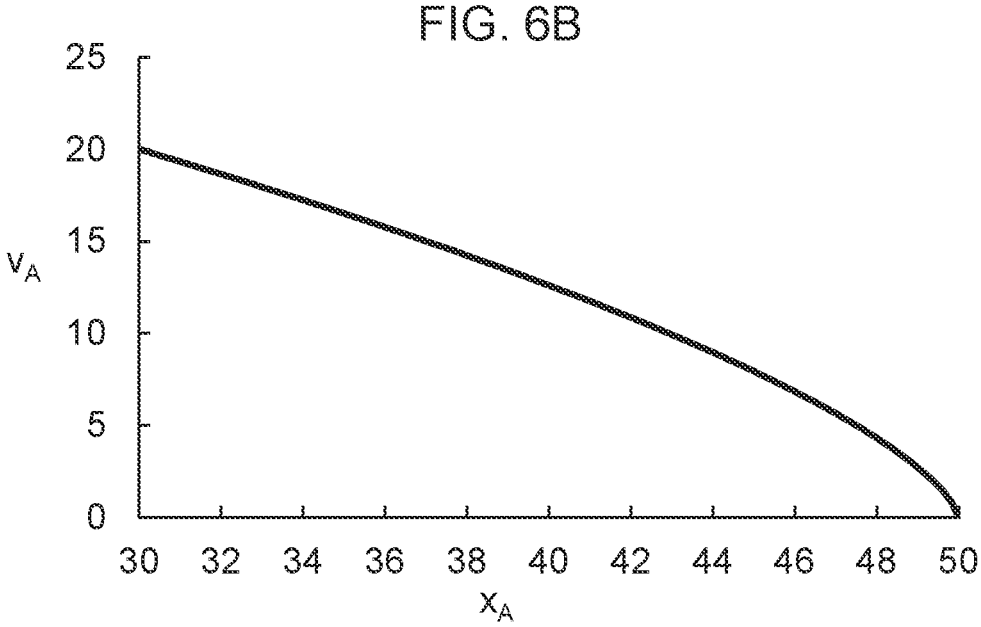
FIG. 6B is a diagram illustrating a control example of a speed change with respect to the position information in Example 1.

Desired control as a control device of the car is as follows. First, the provision of information ($x_{OE}$) relevant to the position at which the reception intensity of the wireless signal is maximized and position information ($x_A$, $x_B$) of both of the information terminals 1 is received from the information terminal 1A. On the basis of such information, control is performed such that the car stops by monotonically decreasing the speed and the acceleration in a continuous period before and including a stopping point, aiming at stopping at the nearest position. Accordingly, it is possible to accurately stop at the nearest position, to decrease the acceleration when stopping, and to reduce a shock when stopping that is felt by the passenger. A control example is illustrated in FIG. 6A and FIG. 6B. FIG. 6A is an acceleration change, and FIG. 6B is a speed change.

An example of speed control will be described below by assuming that the passenger approaches at a constant speed. In order to reduce the shock when the car stops, the speed is controlled aiming at setting the acceleration to 0 at the same time when the speed of the car is 0. Accordingly, as an example, by assuming that a movement speed of the passenger is constant after a certain point, and by setting acceleration of the car to be constant, the control device of the car performs acceleration setting at the point such that the speed and the acceleration of the car is 0 at the nearest movement distance position. In a case where the speed of the information terminal 1A is set to $v_A$, and the acceleration is set to $a_A$, and the speed of the information terminal 1B is set to $v_B$, the setting of $a_A$ is specifically Expression (10) described below.

$$a_A = -2v_A(v_A/3 + v_B)/(x_{OE} - x_B - x_B) \qquad (10)$$

According to the acceleration setting, the control device of the car controls the speed of the car.

In this case, a distance $x_R$ (hereinafter, referred to as a target distance) in which the car moves to the nearest position is Expression (11).

$$x_R = (x_{OE} - x_A - x_B)/(1 + 3v_B/v_A) \qquad (11)$$

When the passenger stands still, $v_B=0$ is set. In addition, the speed of the passenger is not constantly constant, and the value of $x_{OE}$ may be changed, and thus, the value of the right side in Expressions (10) and (11) is acquired at each time.

In a case where the driver controls the car, the information terminal 1A may present the target distance $x_R$ to the driver, and the driver may control the speed with the value as a guideline.

In addition, for safety, an upper limit set in advance may be provided in an absolute value of the acceleration $a_A$ such that an abrupt acceleration or an abrupt deceleration does not occur.

Here, there is a case where an estimation error or a prediction error occurs when the user of the information terminal 1B stands still at first and starts to approach as the information terminal 1A approaches. In this case, in the case of exceeding a peak value in the reception intensity profile, the car may stop immediately by speed control within a safe range.

As described above, it is possible to more accurately estimate the position of the meeting spot, on the basis of the reception intensity of the wireless signal.

Figure 7:
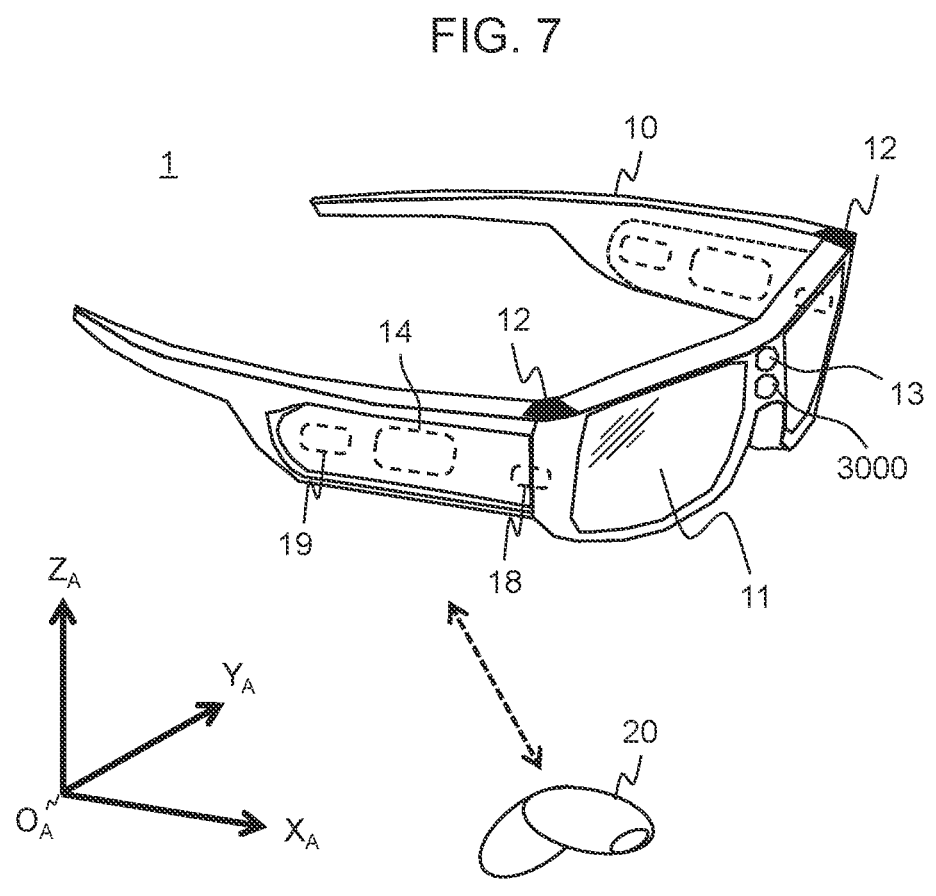

FIG. 7 is an appearance configuration example of the HMD as an example of the information terminal in this example. In FIG. 7, the HMD includes a display device including a display surface 11 in a spectacle-shaped housing 10. Such a display device, for example, is a transmissive display device, and an external real image is transmitted to the display surface 11, and an image is displayed to be superimposed on the real image. A controller, a camera 12, a ranging sensor 13, another sensor unit 14, and the like are mounted on the housing 10.

The camera 12, for example, includes two cameras disposed on both of right and left sides of the housing 10, and captures a range including the front of the HMD and acquires an image. The ranging sensor 13 is a sensor that measures a distance between the HMD and an external object. As the ranging sensor 13, a time of flight (TOF) type sensor may be used, or a stereo camera or other types of sensors may be used. The sensor unit 14 includes a sensor group for detecting the state of the position and the direction of the HMD. A sound input device 18 including a microphone, a sound output device 19 including a speaker or an earphone terminal, and the like are provided on the right side and the left side of the housing 10.

A manipulation device 20 such as a remote controller may be attached to the information terminal 1. In this case, the HMD, for example, performs near-field wireless communication with respect to the manipulation device 20. The user is capable of inputting an instruction relevant to the function of the HMD, moving a cursor, or the like on the display surface 11 by manipulating manually the manipulation device 20. The HMD may communicate and cooperate with an external smart phone, an external PC, or the like. For example, the HMD may receive image data of augmented reality (AR) from an application of the smart phone.

The information terminal 1 may display a virtual image of AR or the like on the display surface 11. For example, the information terminal 1 generates a virtual image for guiding the user, and displays the virtual image on the display surface 11.

Figure 8:
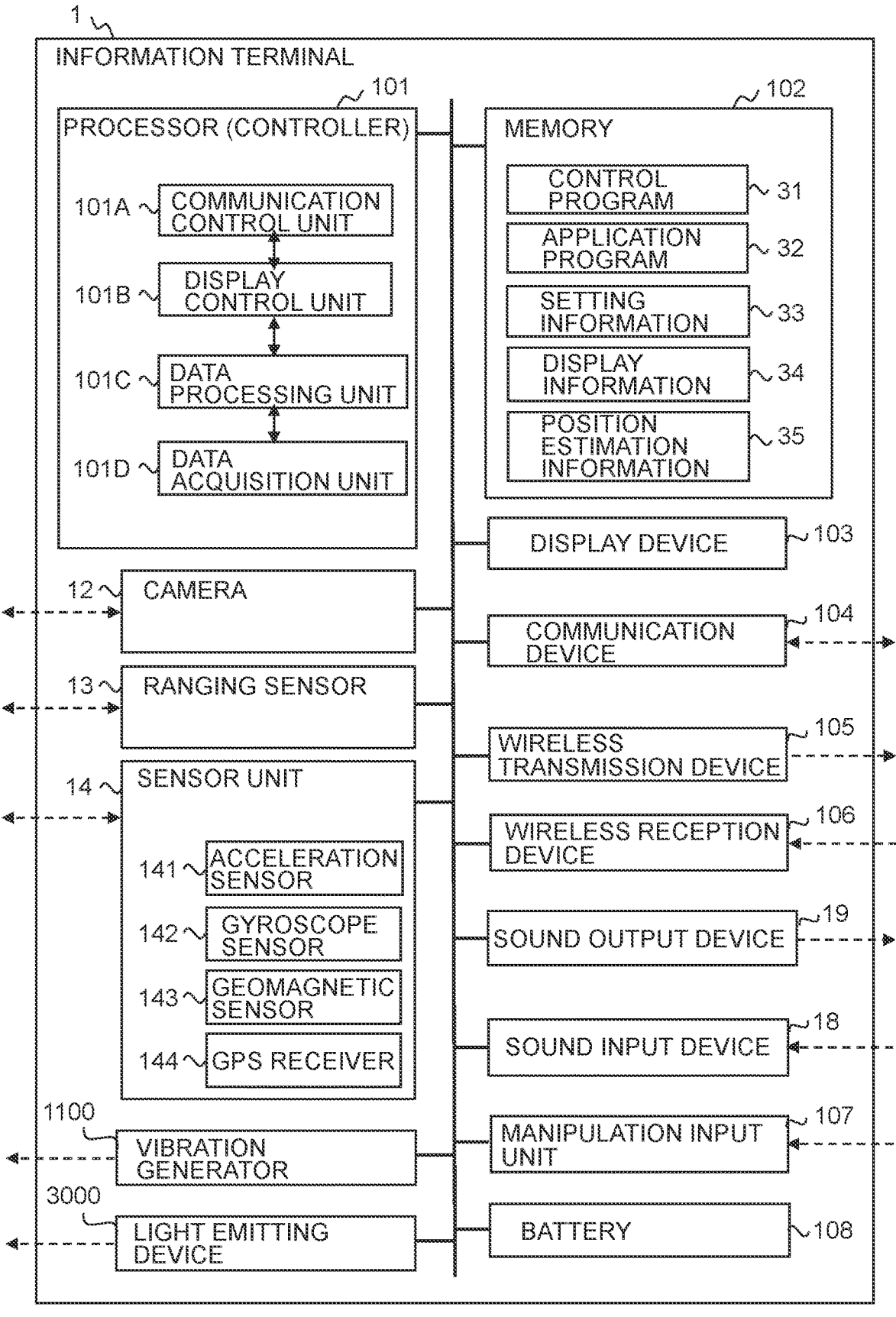
FIG. 8 is a function block configuration example of the information terminal (the HMD) in FIG. 7.

FIG. 8 is a function block configuration example of the information terminal 1 (the HMD) in FIG. 7. Basically, the other information terminal 1 also has the same configuration. The information terminal 1 includes a processor 101, a memory 102, the camera 12, the ranging sensor 13, the sensor unit 14, a display device 103, a communication device 104, the sound input device 18 including a microphone, the sound output device 19 including a speaker or the like, a vibration generator 1100 such as a vibrator, a light emitting device 3000, a wireless transmission device 105, a wireless reception device 106, a manipulation input unit 107, a battery 108, and the like. Such elements are connected to each other through a bus or the like.

The processor 101 includes a CPU, a ROM, a RAM, and the like, and configures the controller of the HMD. The processor 101 attains the function of an OS, middleware, an application, or the like and other functions by executing processing according to a control program 31 or an application program 32 of the memory 102. The memory 102 includes a non-volatile storage device and the like, and stores various data or information pieces that are handled by the processor 101 or the like. In the memory 102, the image acquired by the camera 12 or the like, detection information, and the like are stored as temporary information.

The camera 12 converts light incident from a lens into an electrical signal with an imaging element, and acquires an image. For example, in the case of using a time of flight (TOF) sensor, the ranging sensor 13 calculates a distance from an object from a time for light exiting to the outside to hit the object and return. The sensor unit 14, for example, includes an acceleration sensor 141, a gyroscope sensor (an angular velocity sensor) 142, a geomagnetic sensor 143, and a GPS receiver 144. The sensor unit 14 detects the state of the position, the direction, the motion, or the like of the HMD by using the detection information of the sensor. The HMD is not limited thereto, and may include an illumination sensor, a proximity sensor, a pressure sensor, and the like.

The display device 103 includes a display driving circuit or the display surface 11, and displays the virtual image or the like on the display surface 11, on the basis of image data of display information 34. Note that, the display device 103 is not limited to a transmissive display device, and may be a non-transmissive display device or the like.

The communication device 104 includes a communication processing circuit, an antenna, and the like corresponding to various predetermined communication interfaces. Examples of the communication interface include a mobile network, Wi-Fi (Registered Trademark), BlueTooth (Registered Trademark), an infrared ray, and the like. The communication device 104 performs wireless communication processing or the like with respect to the other information terminal 1 or an access point. The communication device 104 also performs near-field communication processing with respect to the manipulation device.

The wireless transmission device 105 transmits a wireless signal associated with an identification signal used for estimating the position. Here, the wireless signal associated with the identification information, for example, is a signal of Bluetooth or the like. The wireless reception device 106 receives the wireless signal associated with the identification signal, and measures the reception intensity. Information communication may be performed by using the wireless transmission device 105 and the wireless reception device 106.

In addition, in the case of the information terminal 1 that only transmits or receives the wireless signal, required devices may be provided.

The sound input device 18 converts an input sound from a microphone into sound data. The sound output device 19 outputs sound from a speaker or the like, on the basis of the sound data. The sound input device may have a sound recognition function. The sound output device may have a sound synthesis function.

The vibration generator 1100 has a function to generate a vibration and notify the user. The light emitting device 3000 has a function to transmit a code by light of which the intensity is modulated. Note that, far-red light may be used to be inconspicuous.

The manipulation input unit 107 receives manipulation input with respect to the HMD, for example, the on/off of a power source, volume adjustment, and the like, and includes a hardware button, a touch sensor, and the like. The battery 108 supplies power to each unit.

A controller of the processor 101 includes a communication control unit 101A, a display control unit 101B, a data processing unit 101C, and a data acquisition unit 101D, as a configuration example of a function block that is attained by the processing.

In the memory 102, the control program 31, the application program 32, setting information 33, the display information 34, position estimation information 35, and the like are stored. The control program 31 is a program for attaining the estimation of the relative positional relationship between the information terminals 1. The application program 32 is a program for attaining a guide function for the user. The setting information 33 includes system setting information or user setting information according to each function. The display information 34 includes the image data for displaying the virtual image on the display surface 11, or position coordinate information. The position estimation information 35 is information according to the movement distance of the information terminal 1 and the reception intensity of the wireless signal, for estimating the position.

The communication control unit 101A controls communication processing using the communication device 104 when performing communication with respect to the other information terminal 1 and the like. The display control unit 101B controls the display of the virtual image or the like on the display surface 11 of the display device 103 by using the display information 34.

The data processing unit 101C reads the position estimation information 35, and estimates the relative positional relationship between the own device and the opposition terminal.

The data acquisition unit 101D acquires the intensity of the wireless signal from the wireless reception device 106, and acquires each detection data piece from various sensors such as the camera 12, the ranging sensor 13, and the sensor unit 14. The data acquisition unit 101D estimates the own position from the detection data of the various sensor, and measures the movement distance.

Figure 9:
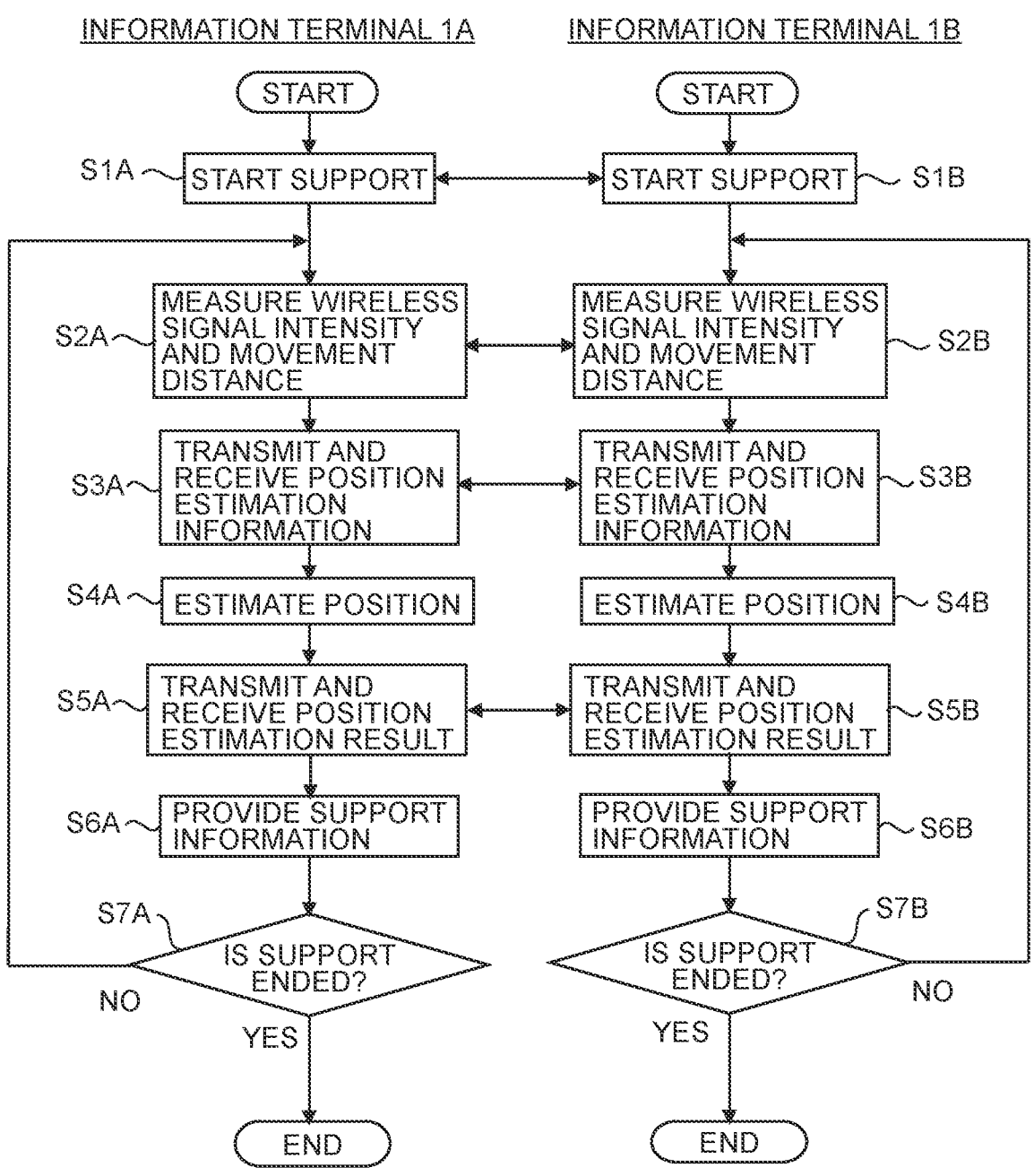
FIG. 9 is a control flowchart of meeting support in Example 1.

FIG. 9 is a control flowchart of the meeting support in this example. In FIG. 9, a schematic meeting area is set, and the information terminal 1 on a reception side acquires the identification information of the wireless signal, before the flow. Note that, either information terminal may be on the transmission side, or the wireless signal may be transmitted from both of the information terminals. At a timing when both of the information terminals 1 enter the vicinity of the meeting spot, first, in steps S1A and S1B, the communication between the information terminals 1 is established, which triggers the start of the meeting support. In addition, the information terminal 1 that is moved sets the originations 112A and 112B for measuring the movement distance. The communication may be performed through a communication network, or may be direct communication between the information terminals 1. After that, the process enters a position estimation loop.

In the position estimation loop, first, in steps S2A and S2B, the information terminal 1 on the transmission side transmits the wireless signal, and the information terminal 1 on the reception side receives the wireless signal and measures the reception intensity. Accordingly, the information terminal 1 on the reception side, for example, generates internal data in which the reception intensity with respect to a measurement time is recorded, as illustrated in FIG. 10A. In a case where both of the information terminals transmit the wireless signal, two electrical wave intensity profiles are obtained as a result. Accordingly, two types of position estimation can be performed, and both of estimation results may be used, or only one result may be used. Further, the information terminal 1 that is moved measures the movement distance, and for example, generates movement distance data, as illustrated in FIG. 10B.

In steps S3A and S3B, one of the information terminals 1 transmits the reception intensity data and the movement distance data to the other information terminal 1. The data may not be transmitted to the information terminal 1 that does not estimate the position.

In steps S4A and S4B, the information terminal 1 that estimates the position generates a reception intensity profile with respect to the relative movement distance as illustrated in FIG. 10C from the reception intensity data and the movement distance data. Then, the information terminal 1 that estimates the position, for example, obtains the estimated value $x_{OE}$ of the nearest movement distance as illustrated in FIG. 10D by the method described above. In this case, when both of the information terminals 1 transmit the wireless signal, and the other information terminal 1 receives the wireless signal, two types of reception intensity profiles are obtained. In this case, both of two types of reception intensity profiles may be used, or only one type of reception intensity profile may be used. Note that, the position estimation in the information terminal 1 is started after at least data necessary for executing the position estimation is accumulated.

In steps S5A and S5B, the information terminal 1 that estimates the position transmits the estimated value $x_{OE}$ of the nearest movement distance obtained by the own terminal to the other information terminal 1. In a case where the other terminal does not require the information, the transmission may not be performed.

In steps S6A and S6B, each of the information terminals 1 provides the information for the meeting support to the user or the control device of the car. An aspect of providing the information will be described in detail in the subsequent examples.

In steps S7A and S7B, in a case where both of the information terminals 1 are capable of checking the opposition terminal, that is, the waiting car or the waiting passenger, and thus, the meeting support is not required, the meeting support is ended, and in a case where the meeting support is required, a branch for continuing the support is performed.

As described above, according to this example, it is possible to perform the meeting support having an improved position accuracy.

Note that, the method of this example is not limited to a meeting between a person and a car, and can also be applied to a meeting between people. In addition, in this example, it has been described that the information terminal includes the wireless signal source associated with the identification information, but the information terminal may include only the wireless signal source without having the function of the information terminal. For example, a child has only the wireless signal source, and thus, it is possible to support a lost child.

Example 2

In this example, support contents with respect to the user on a passenger side, that is, in the information terminal 1B will be described.

According to Example 1, the information terminal 1B acquires the information required for the support. Note that, the support contents according to this example are the same even in a case where the information terminal 1A is mounted on the car, and the driver receives the support by looking at the display of the information terminal 1A.

Figure 11A:
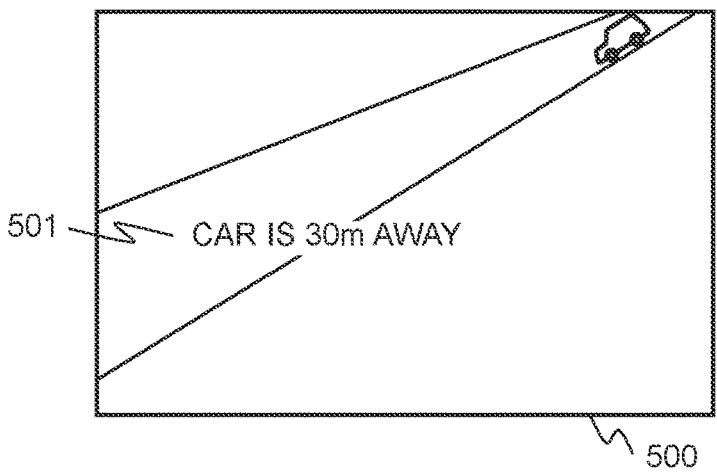
FIG. 11A is an explanatory diagram in which an estimated distance of an opposition information terminal is displayed on a display screen of the information terminal in Example 2.

First, as a simple method, the information terminal 1B displays the estimated distance of the opposition information terminal 1A on the display screen, and provides a hint to search for the car to the user. Such a state is illustrated in FIG. 11A. In FIG. 11A, 500 is a display screen of the information terminal 1B, and 501 is an explanation message for support. In a case where the current position of the information terminal 1B is set to the origination, an estimated distance $x_d$ of the car (that is, the opposition information terminal) is given by Expression (12) described below.

$$x_d = x_{0E} - x_A - x_B \qquad (12)$$

In the case of a see-through HMD, the state of the road can be seen as it is. In the case of other information terminals, the state of the road may be displayed by being captured with a camera.

Figure 11B:
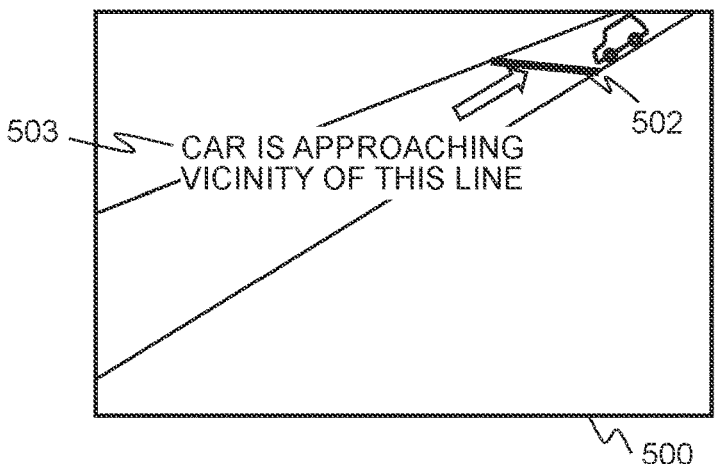
FIG. 11B is an explanatory diagram in which a mark of an AR object is displayed at an estimated position of the opposition information terminal on the display screen of the information terminal in Example 2.

Alternatively, as illustrated in FIG. 11B, the information terminal 1B may display a mark 502 of an AR object at the estimated position of the car. In addition, an explanation message 503 may be simultaneously displayed.

Figure 11C:
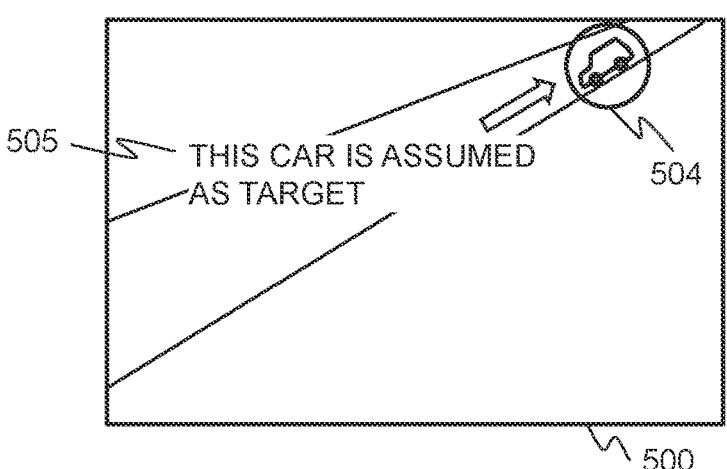
FIG. 11C is an explanatory diagram in which the mark of the AR object indicating the opposition information terminal itself is displayed on the display screen of the information terminal in Example 2.

Further, in a case where there is no candidate car or the car of the meeting opposition can be specified from the feature of the car (the type of car, the color, the number, and the like), the information terminal 1B may display a mark 504 of an AR object indicating the car itself as illustrated in FIG. 11C. In addition, an explanation message 505 may be simultaneously displayed. Further, in a case where there are a plurality of candidates, the mark 504 of the AR object may be displayed to all the candidate cars.

In addition, the information terminal 1B may notify the user with a vibration or the like at a point when the communication between the information terminals is started or a point when it is estimated that the distance between the information terminals is less than a distance set in advance. Accordingly, the user does not need to be attentive to the position of the car until the car approaches.

An example of the support for the passenger has been described above, but the same support can also be provided to the driver of the car (the details will be described below). In this case, an image on a display of the information terminal 1A is the passenger. In addition, feature information of the passenger (for example, a picture) may be used as an aid for the estimation.

In addition, appearance feature information of the passenger or the car that is acquired by the server may be used in combination for the position estimation on the display screen.

In order to display the mark as illustrated in FIG. 11B and FIG. 11C, it is necessary to estimate a position on the road corresponding to the estimated distance $x_d$. Accordingly, the position is estimated as follows. Note that, the following estimation method is the same even in a case where the position of the passenger is estimated from the car side. In this case, each geometric element is replaced with each geometric element on the opposition side.

First, the information terminal 1B measures the movement line 110A of the information terminal 1A (FIG. 3A) and the distance d (113 in FIG. 3A) with respect to the own terminal. In this case, a height $h_B$ (115B in FIG. 3C) of the information terminal 1B is known to the user by setting or the like. The value of $h_B$ may be estimated from user height data recorded in the information terminal 1 or the server instead of directly providing the value of $h_B$.

15

Figure 12A:
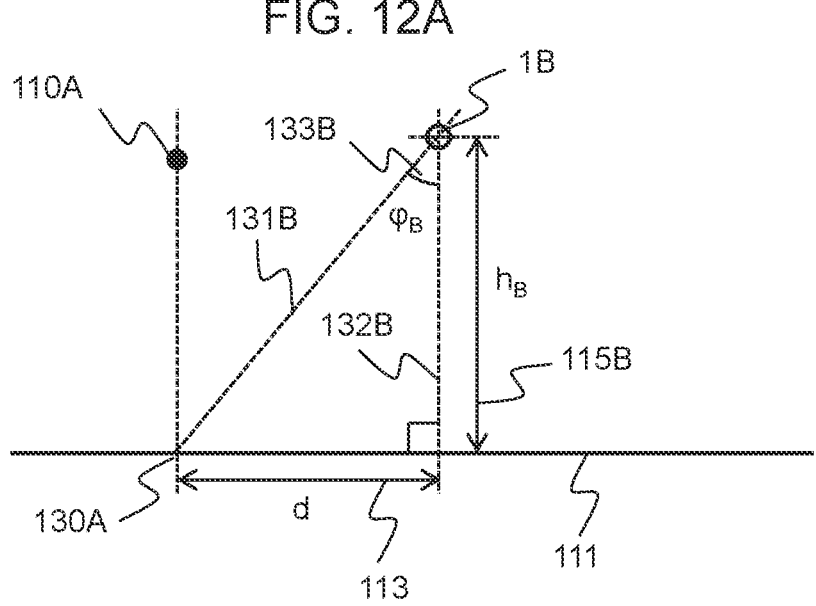
FIG. 12A is a diagram including the information terminal 1B and illustrating a positional relationship of each element on the perpendicular surface orthogonal to the movement line 110A in Example 2.

The estimation of the distance d is performed as illustrated in FIG. 12A. FIG. 12A is a diagram including the information terminal 1B and illustrating a positional relationship of each element on the perpendicular surface orthogonal to the movement line 110A. A projection line in which the movement line 110A is projected in the vertical direction on the earth surface 111 is set to 130A. In a case where the car is not specified, the projection line 130A is not accurately known, but assuming that the car travels on the center of the traffic lane is not considered as a significant error, and thus, the medial line of the traffic lane is set to the projection line 130A. Assuming that a perpendicular line 131B is lifted down to the projection line 130A from the own terminal, the information terminal 1B measures an angle 133B ($\phi_B$) between a perpendicular line 132B and the perpendicular line 131B lifted down to the earth surface 111 from the own terminal. The angle $\phi$ is measured by a camera image and attitude information of the information terminal 1B. In a case where the angle $\phi_B$ is known, the distance d is obtained by Expression (13)

$$d = h_B \tan \phi_B \qquad (13)$$

Figure 12B:
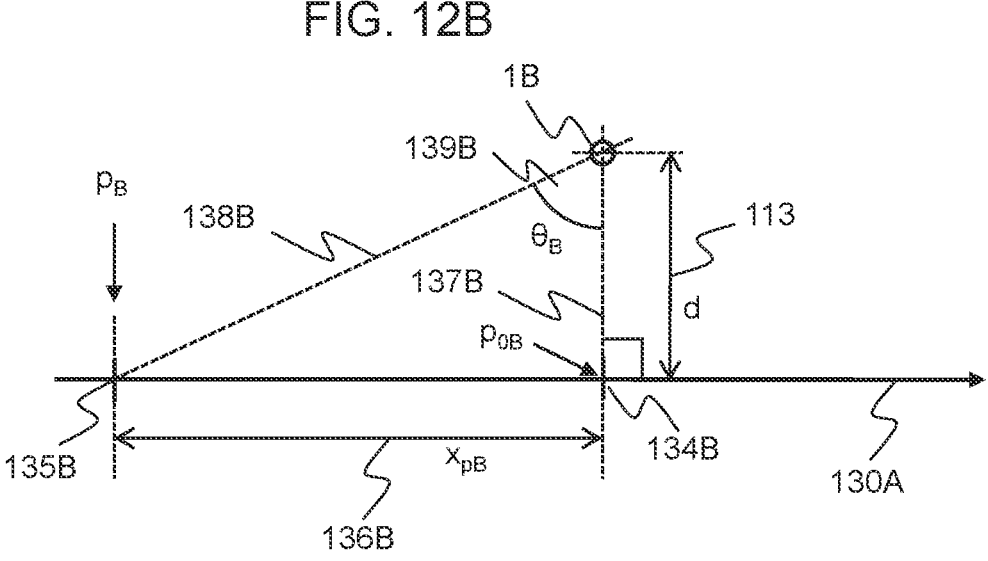
FIG. 12B is a diagram illustrating a positional relationship in which each element in FIG. 12A is projected in a direction vertical to an earth surface 111.

In a case where the distance d is known, a relationship between a spot along the projection line 130A and the direction of the spot is found as follows. FIG. 12B is a diagram illustrating a positional relationship of each element projected in the vertical direction on the earth surface 111. In FIG. 12B, the point of 1B indicates a point in which the position of the information terminal 1B is projected in the vertical direction on the earth surface 111. $p_{OB}$ (134B) is the foot of a perpendicular line lifted down to the projection line 130A from 1B. Then, on the earth surface 111 in FIG. 12B, an angle (139B) between a line segment (137B) connecting 1B and $p_{OB}$ and a line segment (138B) connecting an estimated position $p_B$ and 1B on the projection line 130A of the opposition information terminal 1A is set to $\theta_B$.

According to various values defined as described above, a distance $x_{pB}$ between $p_{OB}$ and the spot $p_B$ (135B) on the projection line 130A is given by Expression (14) described below.

$$x_{pB} = d \tan \theta_B = h_B \tan \phi_B \tan \theta_B \qquad (14)$$

According to Expression (14), the direction of the opposition information terminal 1A can be obtained inversely.

According to Example 1, the information terminal 1B is capable of obtaining the estimated distance $x_d$ of the opposition information terminal 1A given by Expression (12). The estimated position $p_B$ of the opposition information terminal 1A on the projection line 130A is a spot to be Expression (15).

$$x_{pB} = x_d \qquad (15)$$

When combining Expressions (12), (14), and (15), the angle $\theta_B$ that gives the direction of the estimated position of the opposition information terminal 1A is obtained by Expression (16) described below.

$$\theta_B = \tan^{-1}\{(x_{0E} - x_A - x_B)\}/h_B \tan \phi_B\} \qquad (16)$$

Alternatively, in a case where it is difficult to measure $\phi_B$, $\theta_B$ may be obtained by Expression (17) using the estimated value (Expression (9)) of g as an approximation value of d.

$$\theta_B = \tan^{-1}\{(x_{0E} - x_A - x_B)\}/g\} \qquad (17)$$

In FIG. 11B, the information terminal 1B may display the mark 502 of the AR object to be superimposed on the spot on the road in the direction of $\theta_B$.

In addition, in FIG. 11C, the information terminal 1B may search for the car waiting in the vicinity of the spot on the

16 road in the direction of $\theta_B$, and in a case where it is possible to specify a candidate car, the information terminal 1B may display the mark 504 of the AR object to be superimposed on the car.

According to this example, it is possible to check the waiting car before the arrival.

Example 3

In this example, the details of the meeting support on the car side will be described.

Figure 13A:
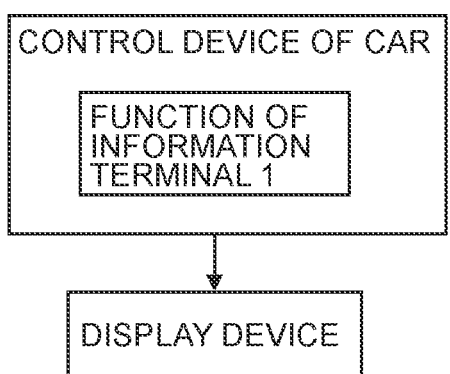
FIG. 13A is an explanatory diagram of a hardware configuration of a car side in Example 3.
Figure 13B:
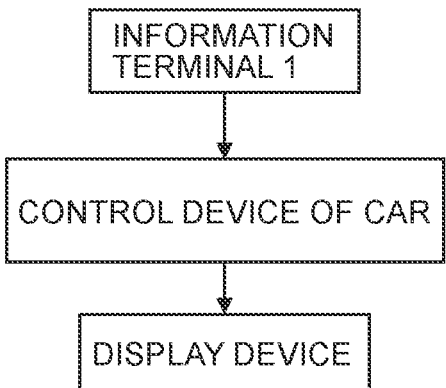
FIG. 13B is an explanatory diagram of another hardware configuration of the car side in Example 3.

As a hardware configuration on the car side, there is a configuration in which the control device of the car has the function of the information terminal 1A, and the control device of the car performs information display with respect to the user (the driver), as illustrated in FIG. 13A. Alternatively, as illustrated in FIG. 13B, there is a configuration in which control information of the car and information used for the display with respect to the user are acquired from the information terminal 1A. Note that, a usage in which the driver looks at the display of the information terminal 1A may be provided.

In a case where the control device of the car controls the speed of the car, the control is performed by the method described in Example 1.

Figure 14A:
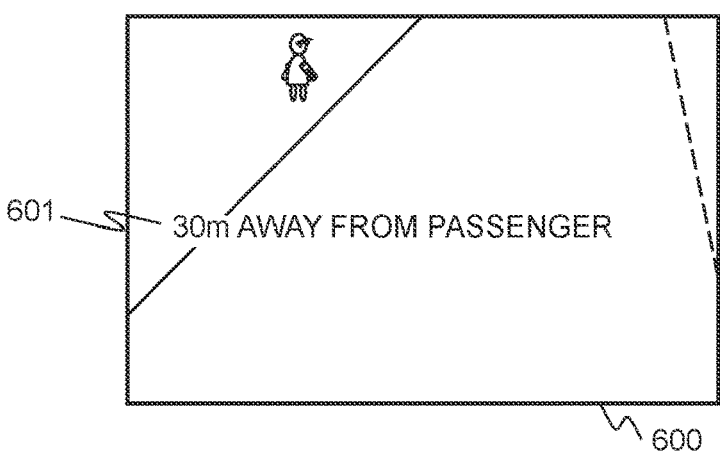
FIG. 14A is an explanatory diagram in which an estimated distance of the passenger is displayed on the display screen of the information terminal in Example 3.
Figure 14B:
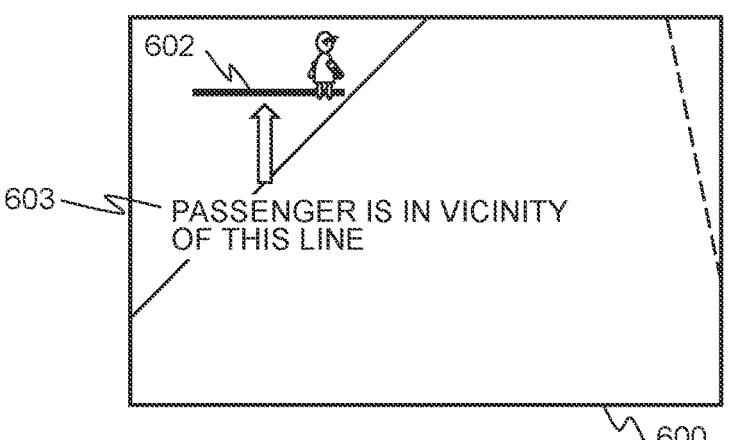
FIG. 14B is an explanatory diagram in which the mark of the AR object is displayed at an estimated position of the passenger on the display screen of the information terminal in Example 3.
Figure 14C:
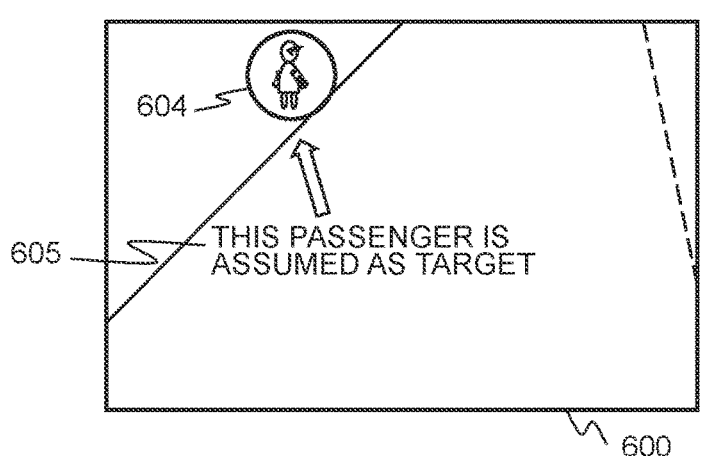
FIG. 14C is an explanatory diagram in which the mark of the AR object indicating the passenger is displayed on the display screen of the information terminal in Example 3.

The control device of the car or the information terminal 1A may present the information to the passenger of the car. For example, it is display as illustrated in FIGS. 14A, 14B, and 14C. Since FIGS. 14A, 14B, and 14C are the same display as that in Example 2, the details thereof will be omitted, but 600 is a display screen of the display, which displays the estimated distance of the passenger. The external state may be video display, or may be a state that can be visually recognized with a head up display (HUD). 601, 603, and 605 are an explanation message that is displayed to be superimposed on the screen. 602 and 604 are a mark of an AR object.

In addition, the appearance feature information of the passenger that is acquired by the server may be used in combination for the position estimation on the display screen.

When seen from the car side, an angle $\theta_A$ of the passenger in the estimated position direction is given by Expression (18) described below from the same consideration as that in Example 2.

$$\theta_A = \tan^{-1}\{(x_{0E} - x_A - x_B)\}/h_A \tan \phi_A\} \qquad (18)$$

Figure 15A:
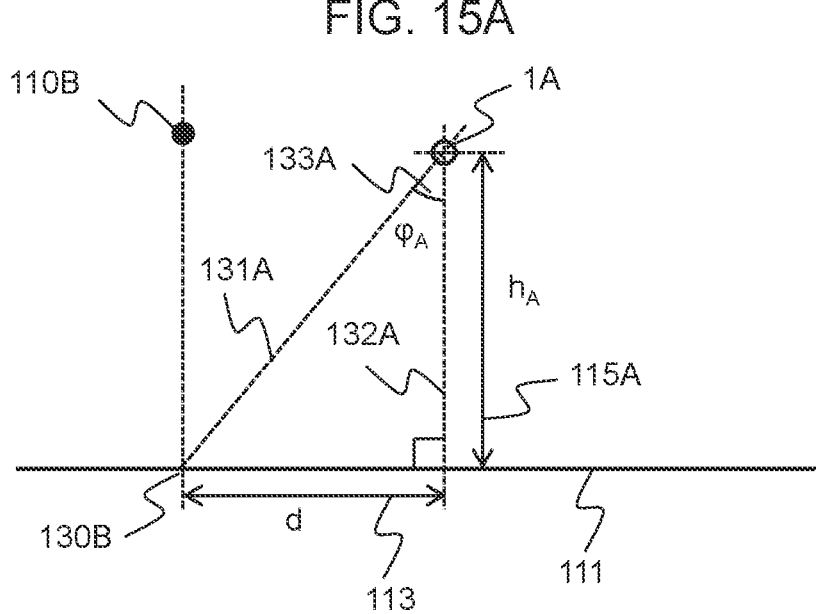
FIG. 15A is a diagram including the information terminal 1A and illustrating a positional relationship of each element on a perpendicular surface orthogonal to a movement line 110B in Example 3.

Here, $\phi_A$ is defined as illustrated in FIG. 15A.

FIG. 15A is a diagram including the information terminal 1A and illustrating a positional relationship of each element on a perpendicular surface orthogonal to the movement line 110B (in a case where the information terminal 1B is not moved, a line when assuming that the movement line 110B is moved in parallel to the movement line 110A of the information terminal 1A). A projection line in which the movement line 110B is projected in the vertical direction on the earth surface 111 is set to 130B. Assuming that the projection line 130B is lifted down to the perpendicular line 131A from the own terminal, the information terminal 1A measures an angle 133A ($\phi_A$) between a perpendicular line 132A and the perpendicular line 131A lifted down to the earth surface 111 from the own terminal. The angle $\phi_A$ is measured by a camera image and attitude information of the camera. Here, in a case where the information terminal 1B, that is, the passenger is not capable of being specified, the projection line 130B is estimated by assuming the position on the side of the road at which the passenger usually stands. For example, assuming the center line of the side walk on the side of the road as the projection line 130B is not considered as a significant error, and thus, such an assumption may be provided.

Figure 15B:
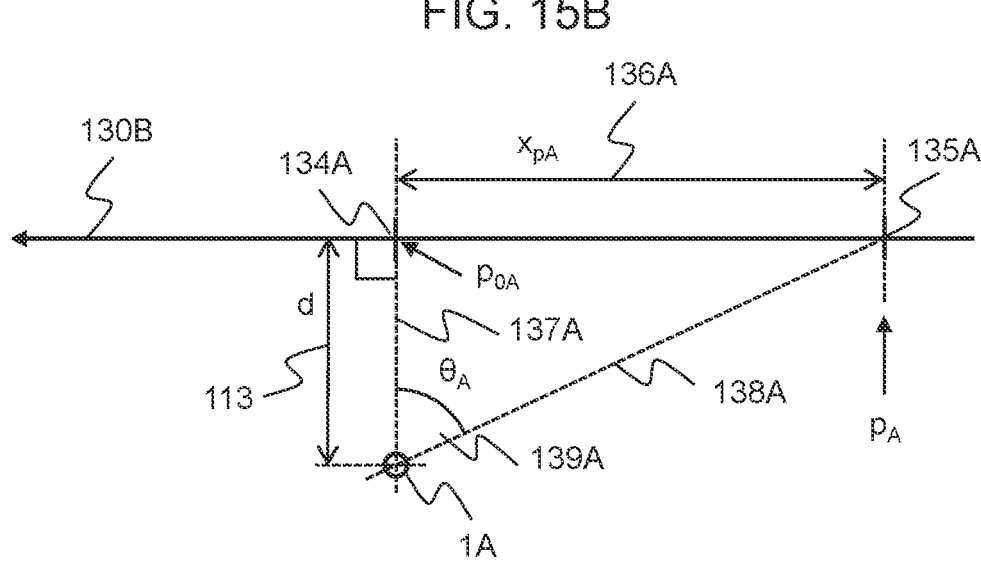
FIG. 15B is a diagram illustrating a positional relationship in which each element in FIG. 15A is projected in the direction vertical to the earth surface 111.

In addition, $\theta_A$ is defined as illustrated in FIG. 15B. FIG. 15B is a diagram illustrating a positional relationship of each element projected in the vertical direction on the earth surface 111. In FIG. 15B, the point of 1A indicates a point in which the position of the information terminal 1A is projected on the earth surface 111. $p_{OA}$ (134A) is the foot of a perpendicular line lifted down to the projection line 130B from 1A. Then, on the earth surface 111 in FIG. 15B, an angle (139A) between a line segment (137A) connecting 1A and $p_{OA}$ and a line segment (138A) connecting an estimated position $p_A$ and 1A on the projection line 130B of the opposition information terminal 1B is set to $\theta_A$.

In addition, $h_A$ is the height of the information terminal 1A, more specifically, the height of a wireless signal transmission source of the information terminal 1A from the earth surface 111. The information of $h_A$ may be stored in the information terminal 1A, or may be retained in the server 2.

Alternatively, as with Expression (17) in Example 2, a value calculated by Expression (19) described below may be used as $\theta_A$.

$$\theta_A = \tan^{-1}\{(x_{0E} - x_A - x_B)\}/g\} \tag{19}$$

Note that, in a case where there is no measurement error, $\theta_A = \theta_B$ is set.

In addition, as with Example 2, the information terminal 1A may notify the user (the driver) with a sound or the like at a point when the communication between the information terminals 1 is started or a point when it is estimated that the distance between the information terminals is less than the distance set in advance. Accordingly, the user does not need to be attentive to the position of the passenger until the passenger approaches.

According to this embodiment, it is possible to check the waiting passenger before the arrival.

Example 4

In this example, the correction of the estimated value in accordance with the condition of the meeting spot will be described.

In a case where there are many buildings, and a reflection component of the wireless signal increases, there is a possibility that the reception intensity profile is distorted from the function form of Expression (4) described above. In order to incorporate the effect of the distortion, the nearest position is estimated by Expression (20) described below as the reception intensity profile, in an area where there are many buildings.

$$P = k/\{\alpha(x - x_0)^3 + (x - x_0)^2 + g^2\} \tag{20}$$

In Expression (20), the third-order term represents the effect of the distortion.

Hereinafter, the function form of Expression (4) will be referred to as a $L_0$ type, and the function form of Expression

(20) will be referred to as a $L_1$ type. $L_1$ type parameter fitting is also performed with respect to $1/P$. As with Example 1, when performing the calculation with the least squares method, weighted processing may be performed by setting the measurement error of the reception intensity P to be constant and the error of $1/P$ to be proportional to $P^{-2}$.

$$1/P = \tag{21}$$
$$(1/k)\{\alpha(x - x_0)^3 + (x - x_0)^2 + g^2\} = A_1x^3 + B_1x^2 + C_1x + D_1$$

Hereinafter, the nearest position, that is, x at which the reception intensity is a local maximum is estimated, and a local extremum point x at which the reception intensity is the local maximum is a local extremum point x that is a local minimum in Expression (21). Since the first order differential of Expression (21) is given by Expression (22) described below, it is found that the first order differential value of Expression (21) is 0 at $x_0$.

$$(1/P)' = (1/k)\{3\alpha(x - x_0)^2 + 2(x - x_0)\} \tag{22}$$

Accordingly, in the estimated value of $x_0$ described below, $x_0$ at which the second order differential value of Expression (21) is positive is x at which the reception intensity is the local maximum.

Expression (21) is linear for parameters $A_1$, $B_1$, $C_1$, and $D_1$, and is obtained from the reception intensity data by the least squares method. A relationship between the parameters $A_1$, $B_1$, $C_1$, and $D_1$ and the parameters in Expression (21) is as follows.

$$\alpha/k = A_1 \tag{23}$$

$$(1 - 3\alpha x_0)/k = B_1 \tag{24}$$

$$-(2x_0 - 3\alpha x_0^2)/k = C_1 \tag{25}$$

$$(x_0^2 + g^2 - \alpha x_0^3)/k = D_1 \tag{26}$$

When combining Expressions (23), (24), and (25), two types of $x_0$ are obtained as described below.

$$x_0 = \{-B_1 \pm (B_1^2 - 3A_1C_1)^{1/2}\}/(3A_1) \tag{27}$$

On the other hand, the second order differential of (21) is Expression (28) described below.

$$(1/P)'' = 6A_1x + 2B_1 \tag{28}$$

19

Among them, the positive second order differential value represented by Expression (28) is as described below.

$$x_0 = \{-B_1 + (B_1^2 - 3A_1C_1)^{1/2}\}/(3A_1) \qquad (29)$$

Here, $$J = B_1^2 - 3A_1C_1 \qquad (30)$$

When $J>0$, a local extremum value is obtained at $x_0$. Since $J \leq 0$ indicates that Expression (21) does not have the local extremum value, it is not possible to use the $L_1$ type fitting.

By setting $x_0$ as the value of Expression (29), the value of other parameters $\alpha$ and g is represented in Expressions (31) and (32).

$$\alpha = (1/3)(2x_0 - C_1/B_1)/(x_0^2 - (C_1/B_1)x_0) \qquad (31)$$

$$g = (\alpha x_0^3 - x_0^2 - \alpha D_1/A_1) \qquad (32)$$

Hereinafter, $J>0$ is set, and $x_0$ of Expression (29) is used as the estimated value of x that gives the local maximum of the reception intensity. The processing and the control in other examples are performed by setting $x_0$ of Expression (29) as $x_{0E}$.

Note that, in the range of x in which an absolute value of $x-x_0$ is large, a $L_1$ type approximation is degraded, and thus, the reception intensity data used in the $L_1$ type fitting may be limited to data close to $x_0$ that is estimated.

Next, a method for evaluating the amount of wall of the building (hereinafter, referred to as the amount of building) that contributes to the reflection of the electrical wave will be described.

Figure 16:
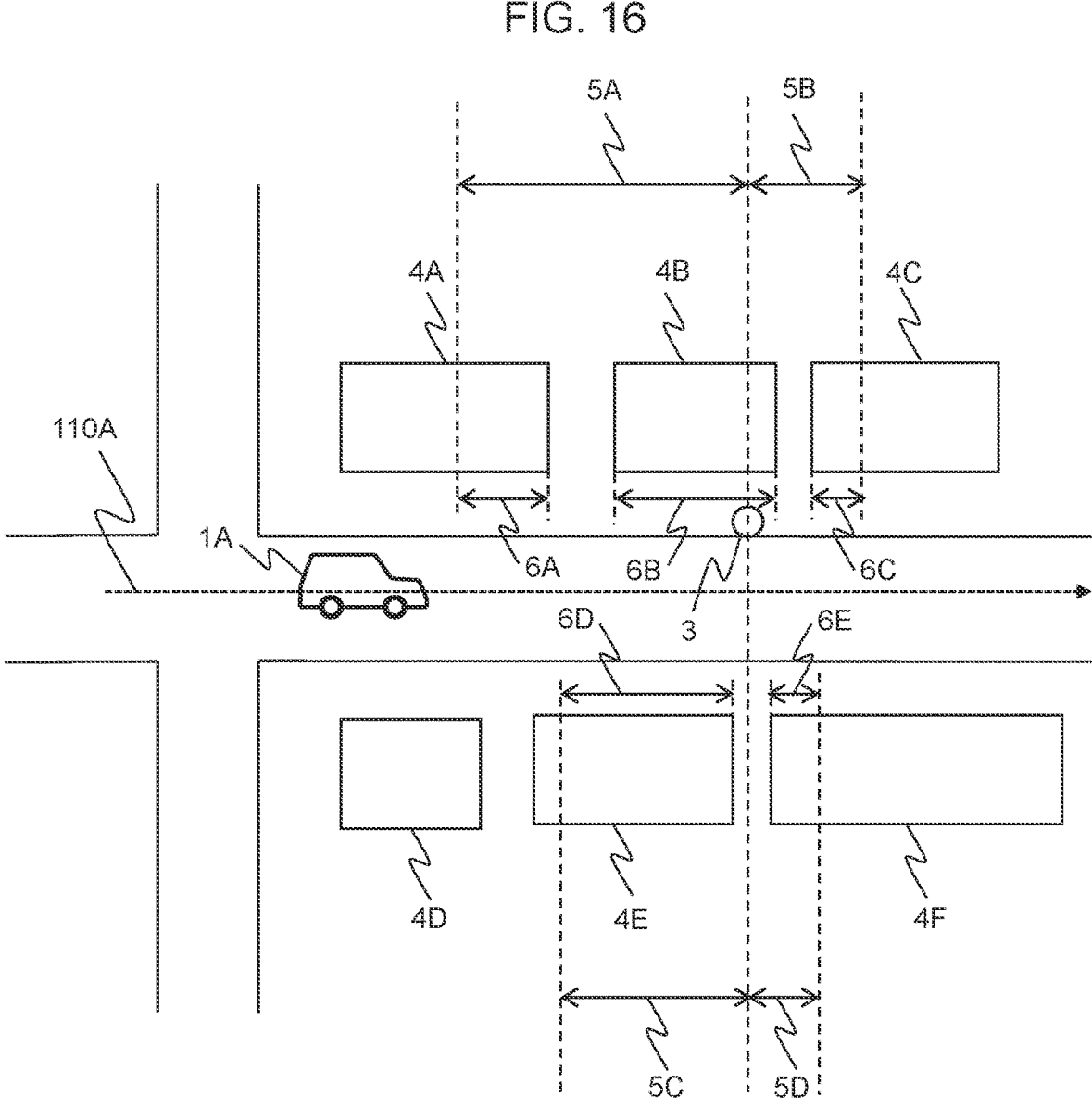
FIG. 16 is an explanatory diagram for illustrating a method for evaluating an influence of a building that contributes to a reflection of an electrical wave in Example 4.

FIG. 16 is an explanatory diagram for illustrating the method for evaluating the influence of the building that contributes to the reflection of the electrical wave in this example. The influence of the building, for example, is evaluated by using map information. FIG. 16 is the map information indicating the condition of a surrounding building 4 at a meeting spot 3. The map information may be acquired from the server 2, or may be retained in the own terminal. In FIG. 16, there are 4A to 4F as the surrounding building 4 at the meeting spot 3, but the influence of the building 4 has a problem of the reflection of the wireless signal, and thus, is evaluated by the length of the wall facing the path of the car, in a predetermined range 5 set in advance from the meeting spot 3, along the path of the car 1A.

The predetermined range 5 may be widely set in an area with a high importance. For example, the predetermined range 5 may be separately set to 5A, 5B, 5C, and 5D in accordance with whether the car is short or ahead of the meeting spot 3, and whether the car is along the road on the meeting spot side or on the opposite road, while the car is approaching. Since the position of the passenger is estimated in a state where the car 1A is on the near side, the building 4 on the near side from the meeting spot 3 is important, and in consideration of the distance, the building 4 along the road on the meeting spot 3 side is important.

In a case illustrated in FIG. 16, a length 6 of the wall facing the path of the car in the set predetermined range 5 is 6A, 6B, 6C, 6D, and 6E. The total length of the walls is set to the amount of wall of the building that contributes to the reflection of the electrical wave.

As one control method, as illustrated in FIG. 17A, there is a method in which in accordance with the condition of the building 4, the $L_0$ type is used as the function form of the fitting in a case where the amount of wall of the building 4 is a predetermined amount or less, and the $L_1$ type is used in a case where the amount of wall is greater than the predetermined amount. Alternatively, as illustrated in FIG. 17B, in the range of x in which the absolute value of $x-x_0$ is large, the $L_1$ type approximation is degraded, and thus, a method may be used in which the $L_0$ type is used in a case where a distance to the meeting spot 3 is greater than a predetermined value, and the $L_1$ type is used in a case where the distance is the predetermined value or less. Note that, in the case of switching the fitting function, in accordance with the position of the car, there is a possibility that the estimated distance to the passenger is significantly changed by the switching, and thus, weighted-average according to the position of the estimated value of two fitting functions for a constant interval may be used.

In addition, two methods described above may be combined. For example, as represented in Expression (33) described below, a predetermined distance $T_P$ for switching the fitting function may be changed by the amount $M_B$ of wall of the building.

$$T_P = f(M_B) \qquad (33)$$

Since there is a high possibility that the distortion of the reception intensity profile increases as the amount of wall of the building increases, f is set to a weakly increasing function. Alternatively, a threshold value may be controlled as illustrated in FIG. 17C. Here, setting is performed such that $$T_{P1} < T_{P2} \qquad (34)$$

is established.

Note that, in a case where the $L_1$ type is used as the fitting function, the value of J (Expression (30)) being 0 or negative indicates that the fitted function does not have the local extremum value, and thus, the estimated value according to the $L_0$ type fitting function is used regardless of the condition described above.

According to this example, it is possible to correct the estimated value, in accordance with the condition of the meeting spot.

Example 5

In this example, in a case where it is possible to specify the meeting opposition before the arrival, the estimation of a distance to the arrival, based on information indicating in which direction the opposition can be seen will be described.

In this example, a case will be described in which the information terminal 1A on the car side specifies the passenger, but the same applies to the opposite case. The relationship in various values is derived as with Example 3. The reference numerals are based on FIG. 15A and FIG. 15B.

First, a direction $\theta_A$ of the passenger specified by the information terminal 1A is measured. The angle $\theta_A$ is measured by the camera image and the attitude information of the camera. A relationship between the direction $\theta_A$ of the passenger and the distance $x_d$ to the nearest position is the same as the consideration in Example 3, and is Expression (35) described below by Expression (18).

$$x_d = x_{0E} - x_A - x_B = h_A \tan \phi_A \tan \theta_A \qquad (35)$$

Accordingly, the estimated value $x_{0E}$ of the nearest movement distance $x_0$ based on the measurement of the direction is obtained.

In Example 1, $x_{OE}$ is estimated from the reception intensity change of the electrical wave, but the speed of the car is controlled using $x_{OE}$ obtained by Expression (35), instead of $x_{OE}$. Note that, processing of gradually switching to the control according to the measurement of the camera from the control based on the reception intensity of the electrical wave by using each method in combination for the switching period may be performed and using the weighted-average of the value of $x_{OE}$ estimated by each method such that the control of the speed of the car does not cause a shock when switching.

Further, the control device of the car may shift a target stopping position from the $x_{OE}$ by only a difference in the position between the information terminal 1A and the door of the car in a traveling direction such that the door of the car is in front of the passenger at the stopping position of the car.

In addition, in a case where the passenger is capable of specifying the position of the car, $x_{OE}$ may be estimated by the information terminal 1B, the information may be transmitted to the car, and the control device of the car may control the car by using the value.

In a case where the measurement of the camera is performed on the passenger side, Relational Expression (36) described below corresponding to Expression (16) is used on the basis of Example 2.

$$x_d = x_{0E} - x_A - x_B = h_B \tan \phi_B \tan \theta_B \qquad (36)$$

Here, the angle $\theta_B$ is measured by the camera image and the attitude information of the camera in the information terminal 1B.

As described above, it is possible to more accurately control the stopping position.

Example 6

In this example, a countermeasure for a case where the car is not capable of successfully stopping in front of the passenger will be described.

Figure 18A:
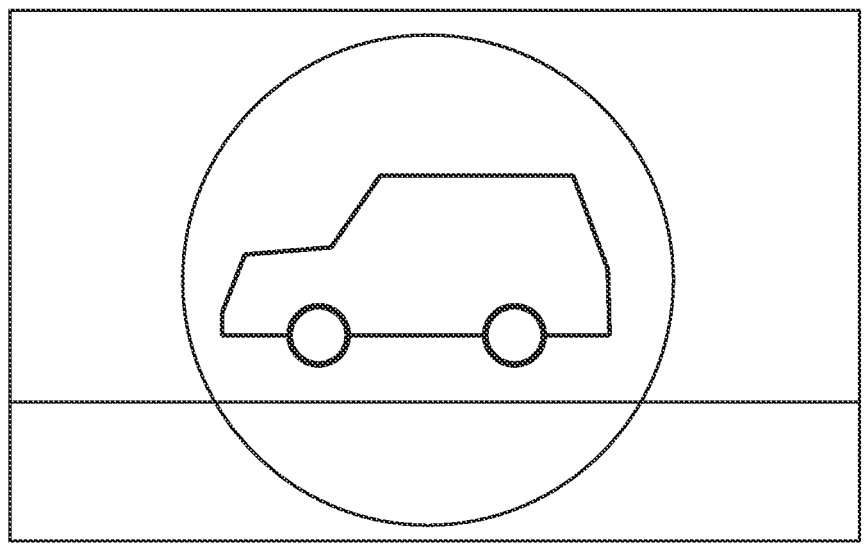
FIG. 18A is a diagram illustrating that a car in front of a point at which the reception intensity is maximized is captured as a waiting car in Example 6.
Figure 18B:
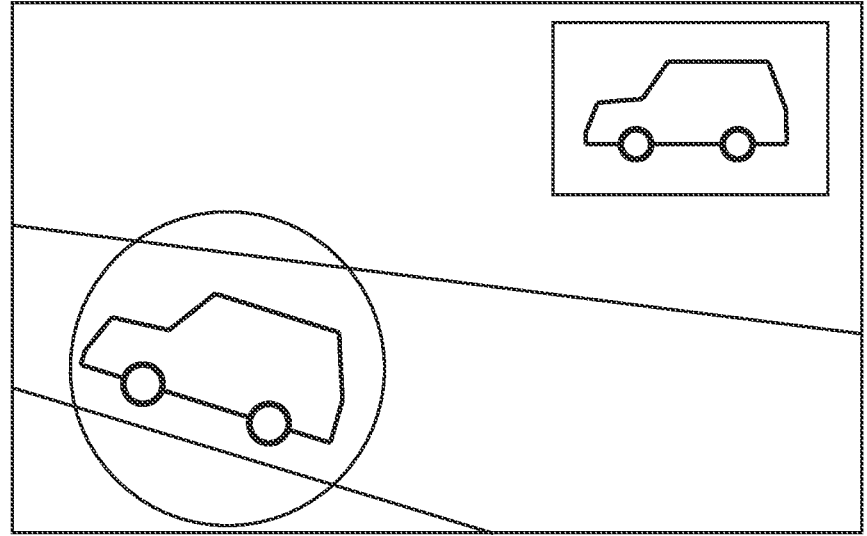
FIG. 18B is a diagram illustrating that an image captured at a front position is displayed on the screen of the information terminal and a mark is displayed to be superimposed on a video of a target car in Example 6.

In a case where the car is not capable of successfully stopping in front of the passenger, the car in front at the point when the reception intensity is maximized is the waiting car, and thus, the car is captured as illustrated in FIG. 18A, and the captured image is used for the subsequent guide. The image captured at the front position is displayed on the screen of the information terminal 1B as illustrated in FIG. 18B, and in a case where the car can be tracked with the camera, a mark is displayed to be superimposed on the video of the target car.

The control device of the car slows down in a range where the safety can be ensured, and stops the car after a point when finding that the car has passed the passenger.

As described above, even in a case where the car is not capable of stopping at the front position of the passenger, it is possible to guide the passenger to the car.

Example 7

In this example, a modification example of a user interface will be described.

In this example, when a smart phone that is the information terminal 1C of the passenger who has called a taxi displays the position of the taxi on a map, a mark for displaying the position of the taxi, that is, the opposition information terminal 1A is changed between a state where a wireless signal of direct communication is not received and a state where the wireless signal of the direct communication is received. Here, the wireless signal of the direct communication is a wireless signal such as the beacon signal associated with the identification signal described above, and in this example, may be simply described as the wireless signal. In addition, the opposition information terminal 1A transmits the wireless signal, and the information terminal 1C receives the wireless signal.

Figure 19A:
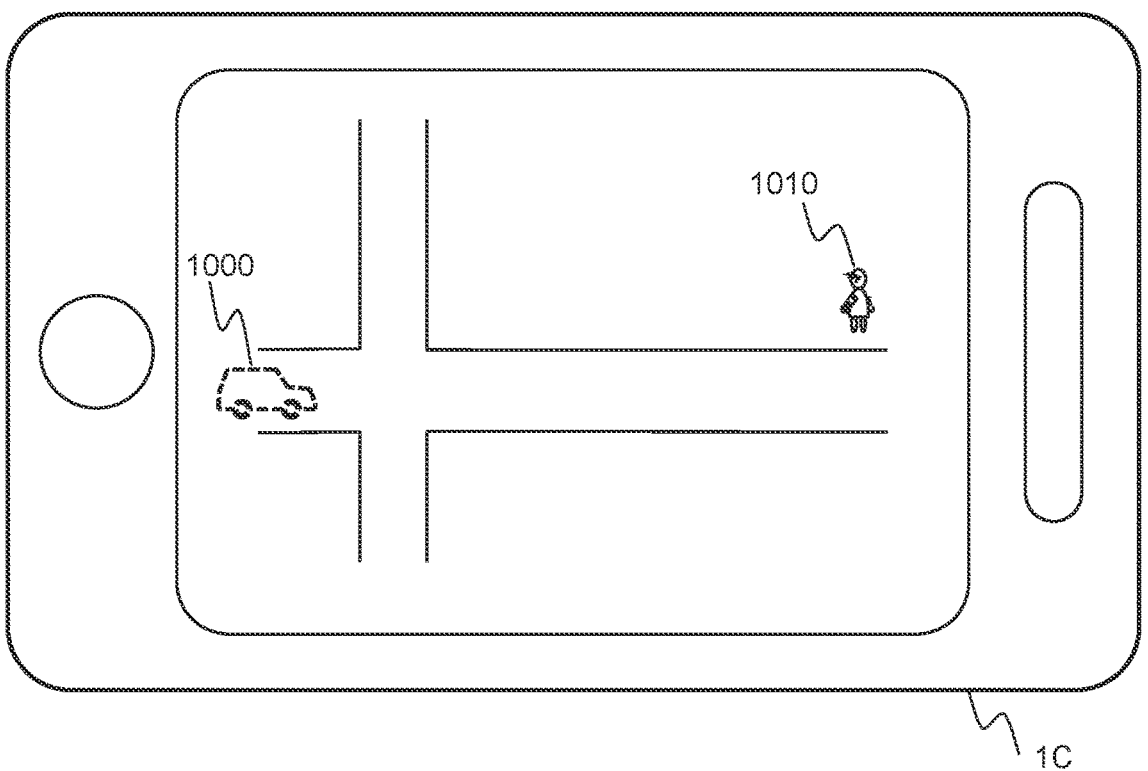
FIG. 19A is a display screen of an information terminal 1C in a state where a position of the opposition information terminal 1A is distant from the meeting spot and the information terminal 1C does not receive a wireless signal in Example 7.
Figure 19B:
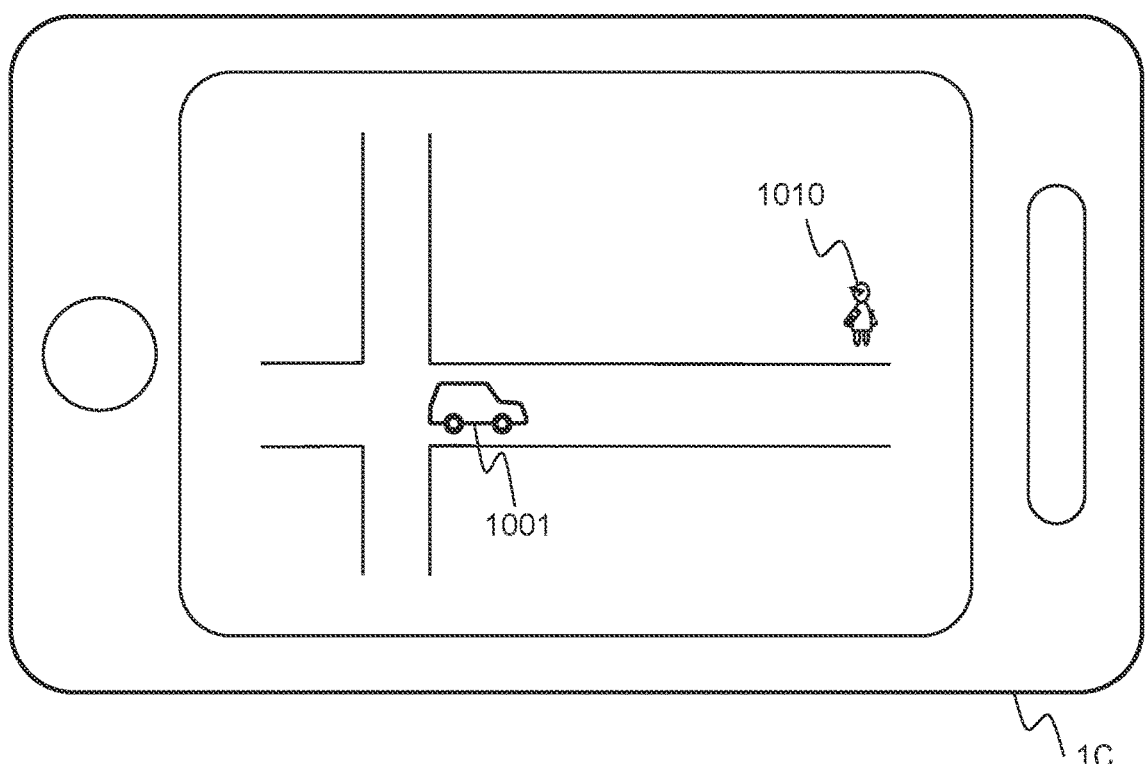
FIG. 19B is a display screen of the information terminal 1C in a state where the opposition information terminal 1A approaches the meeting spot and the information terminal 1C receives the wireless signal in Example 7.

FIG. 19A is a display screen of the information terminal 1C in a state where the position of the opposition information terminal 1A is distant from the meeting spot and the information terminal 1C does not receive the wireless signal in this example. In this case, the information terminal 1C displays a mark drawn with a dotted line as a mark 1000 for displaying the opposition information terminal 1A on the map. On the other hand, FIG. 19B is a display screen of the information terminal 1C in a state where the opposition information terminal 1A approaches the meeting spot and the information terminal 1C receives the wireless signal in this example. In this case, the information terminal 1C displays a mark drawn with a solid line as a mark 1001 for displaying the opposition information terminal 1A on the map. Note that, in the above description, the mark 1000 and the mark 1001 are distinguished by the dotted line and the solid line, but the present invention is not limited thereto. For example, there may be a difference on display such as grading, changing colors, and surrounding with a wall. Note that, in FIG. 19A and FIG. 19B, a mark 1010 represents the position of the own information terminal.

As a method for displaying the mark, the mark 1001 may be continuously displayed after the opposition information terminal 1A approaches the meeting spot and the information terminal 1C starts to receive the wireless signal, and when the information terminal 1C is not capable of receiving the wireless signal for certain reasons, the display of the mark 1000 may be returned.

The information terminal 1C acquires display position information of the opposition information terminal 1A on the map from the opposition information terminal 1A through communication such as the internet, other than the direct communication, before the information terminal 1C is capable of receiving the wireless signal. The opposition information terminal 1A measures the position by oneself using a GPS or the like. On the other hand, the information terminal 1C may determine the display position of the opposition information terminal 1A on the map by a method for assuming the display position from a change in the reception intensity of the wireless signal described above, after the information terminal 1C is capable of receiving the wireless signal. Note that, the information terminal 1C may gradually change the display position of the opposition information terminal 1A to the position determined by the method for assuming the position from a change in the reception intensity of the wireless signal from the position acquired by the opposition information terminal 1A such that the display position of the opposition information terminal 1A is not precipitously changed before and after starting to receive the wireless signal.

Figure 20:
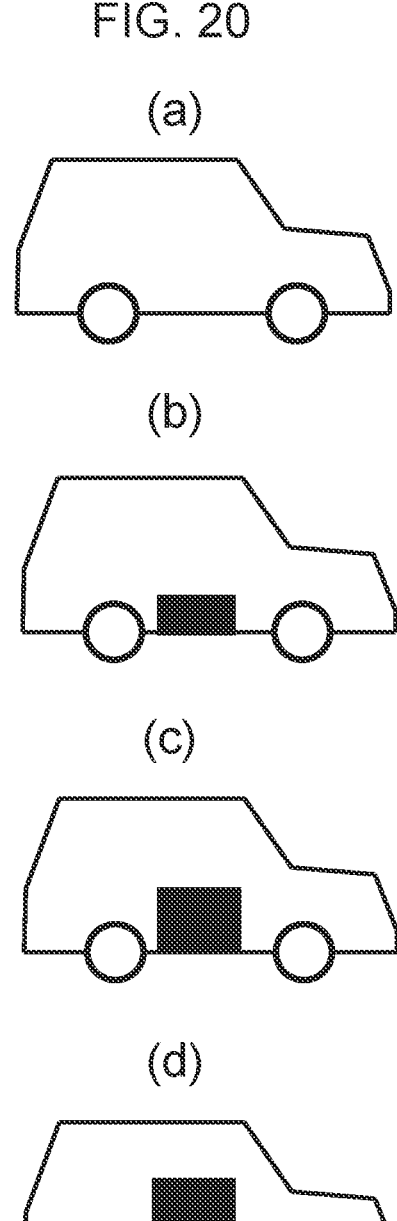
FIG. 20 is an explanatory diagram in which display is changed in accordance with the reception intensity in Example 7.

Further, the information terminal 1C may gradually change the mark representing the opposition information terminal 1A, in accordance with not only the presence or absence of the reception of the wireless signal but also the reception intensity of the wireless signal. For example, as illustrated in FIG. 20, the information terminal 1C displays the length of bars in the marks of (a) to (d) to be increased as the reception intensity increases.

Figure 21:
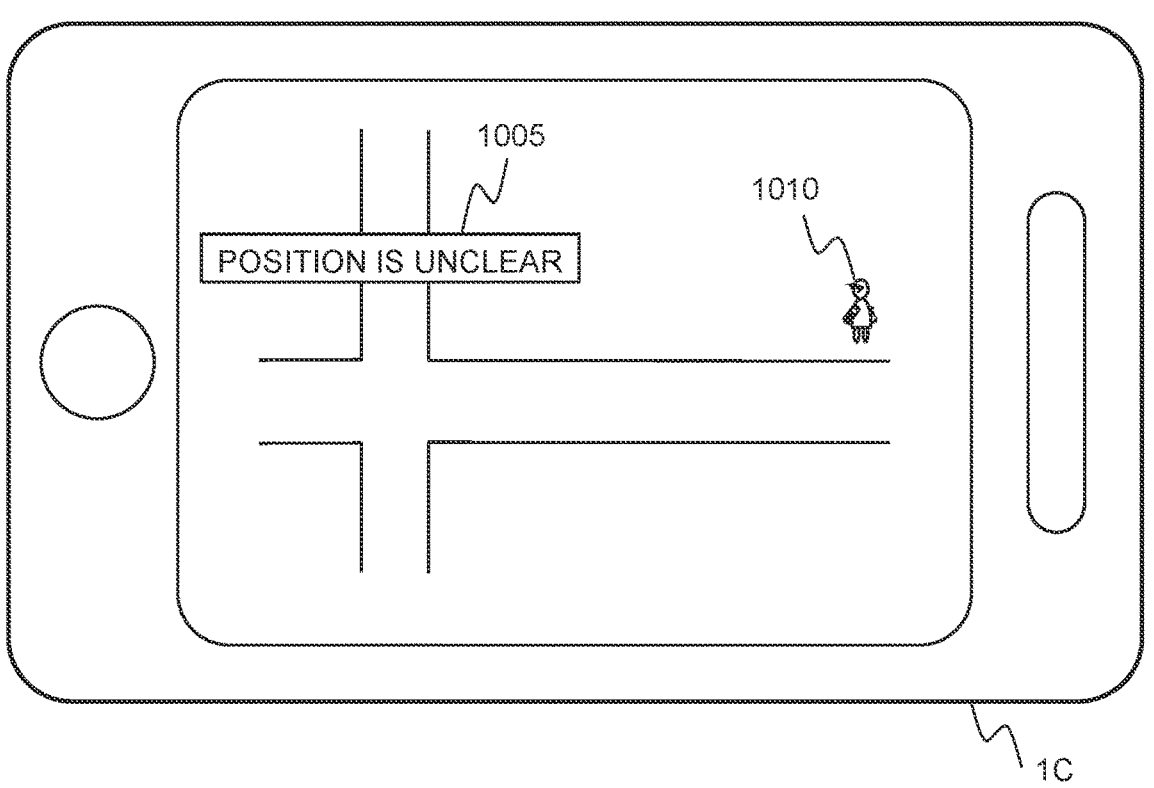
FIG. 21 is a display screen displaying an explanation message indicating that the position is unclear in Example 7.

In addition, in a case where the information terminal 1A is not capable of measuring the own position due to a reason such as being incapable of receiving a GPS electrical wave, and the position is not also capable of being estimated by the wireless signal of the direct communication, the information terminal 1C may display an explanation message 1005 indicating that the position is unclear, as illustrated in FIG. 21, instead of displaying the mark indicating the position of the information terminal 1A on the map.

Figure 22:
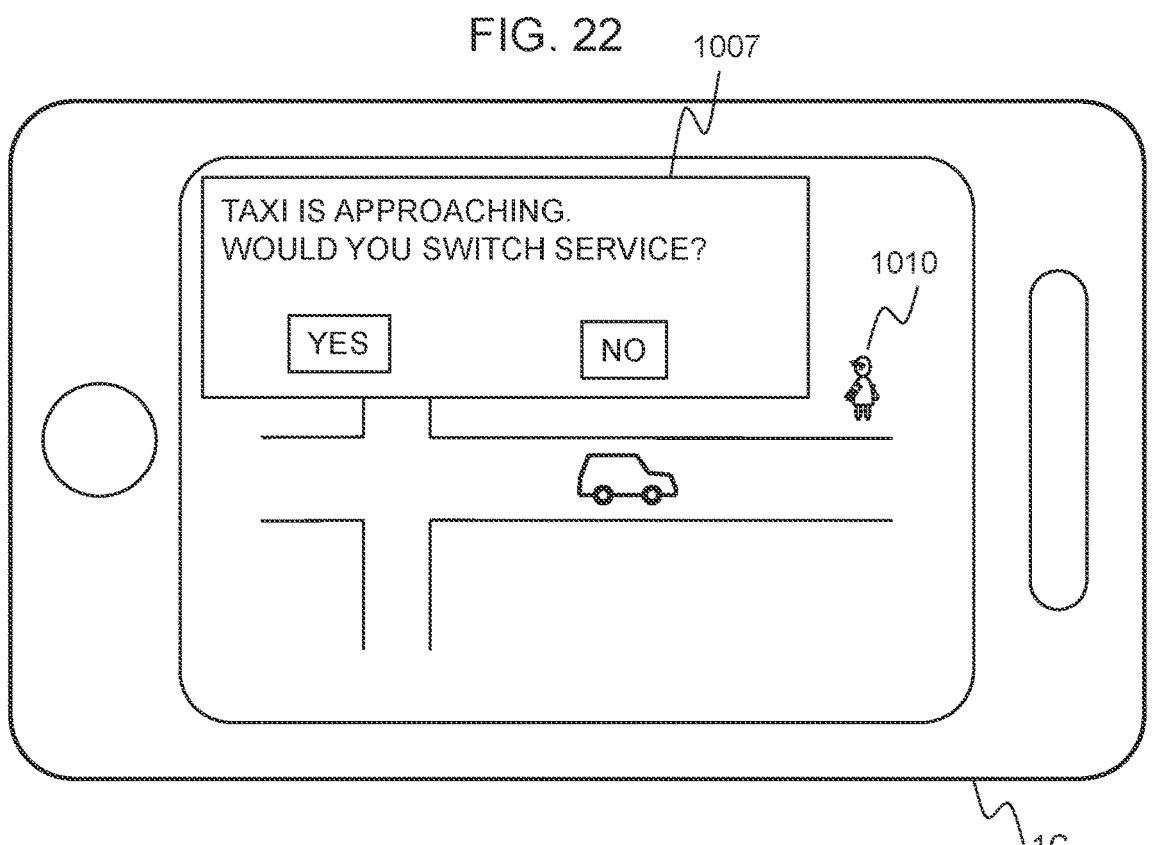
FIG. 22 is a display screen displaying a service switching input box in Example 7.

Further, the information terminal 1C is capable of not only displaying the position of the opposition information terminal 1A but also switching to a service in which the user is capable of visually recognizing the opposition information terminal 1A in the form of a camera image or the direct view of the user in a case where the position of the opposition information terminal 1A approaches, as illustrated in FIG. 11A to FIG. 11C. Such service switching may be automatically performed by the information terminal 1C, or a user instruction may be received by an input box 1007 or the like, illustrated in FIG. 22. In addition, a cooperative operation of the information terminal 1C and the information terminal 1B may be performed to start a new service with another information terminal 1B (for example, the HMD).

Figures 23, 24:
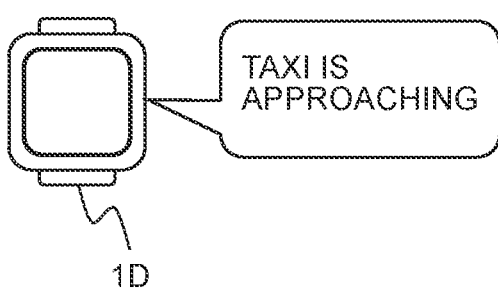
FIG. 23 is an explanatory diagram of a sound notification corresponding to a reception intensity of the wireless signal in Example 7.
FIG. 24 is an explanatory diagram of a vibration notification corresponding to the reception intensity of the wireless signal in Example 7.

In a case where the information terminal of the user is the information terminal 1D such as a smart watch, notification corresponding to the reception intensity of the wireless signal from the opposition information terminal 1A may be performed with not only the display of the mark but also a sound or a vibration. That is, in the sound notification, as illustrated in FIG. 23, the information terminal 1D performs a notification that the opposition information terminal 1A (the taxi) approaches or the notification of a change in the reception intensity at a point when the wireless signal of the direct communication is received. In addition, in the vibration notification, as illustrated in FIG. 24, the information terminal 1D generates a vibration in a vibration pattern set in advance at a point when the reception intensity is changed.

Note that, in the above description, a case has been described in which the opposition information terminal 1A transmits the wireless signal, and the information terminal 1C receives the wireless signal, but the information terminal 1C may transmit the wireless signal, and the information terminal 1A may receive the wireless signal. In this case, the information terminal 1A acquires the information of the reception intensity of the wireless signal from the information terminal 1C by the direct communication or other communication means.

Figure 25:
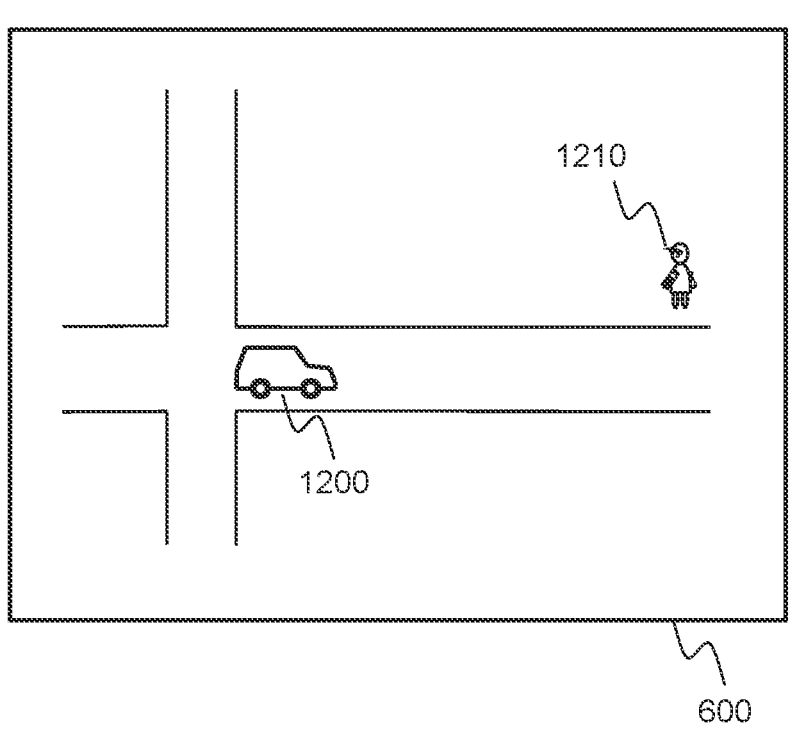
FIG. 25 is a display screen of the information terminal 1A in Example 7.

In addition, the type of information terminal is not limited to those exemplified. For example, an information terminal on a taxi side may be the own information terminal 1A, a smart phone of a customer may be the opposition information terminal 1C, and the mark display according to the reception intensity, the sound notification, and the vibration notification may be performed on the information terminal 1A side. A display example in the information terminal 1A is illustrated in FIG. 25. A mark 1200 represents the position of the own information terminal 1A, and a mark 1210 represents the position of the opposition information terminal 1C. Then, the information terminal 1A deforms the mark 1210 corresponding to the reception intensity of the wireless signal. Since a specific modification example is basically the same as the above, the details thereof will be omitted.

As described above, in a case where the presence or absence of the reception of the wireless signal or the reception intensity is known, the user is capable of visually grasping the distance of the opposition information terminal 1A that the user is waiting for the arrival from the own information terminal. In addition, in a case where the wireless signal can be received, and the user knows that the opposition information terminal 1A approaches, it is preferable for the user to grasp a timing for switching the service, such as switching to the display for the meeting support described in other Examples. Further, it is also possible for the user to preferably control the contents of the meeting support according to the position of the opposition information terminal 1A by the information terminal 1C, and the convenience of the user is improved.

Example 8

In this example, a modification example of a meeting support service using a camera image will be described.

The information terminal 1C acquires an image (a still image or a moving image, hereinafter, referred to as an opposition information terminal image) in a direction in which the own information terminal 1C is positioned that is captured by the opposition information terminal 1A on the basis of the estimated position of the own information terminal 1C, and specifies the position of the own information terminal 1C in the image. Then, the information terminal 1C transmits the specified position information of the own information terminal 1C in the opposition information terminal image to the opposition information terminal 1A, and the opposition information terminal 1A specifies the position of the information terminal 1C from the received position information. Here, the position in the image indicates a position in an image drawing region.

Figure 26A:
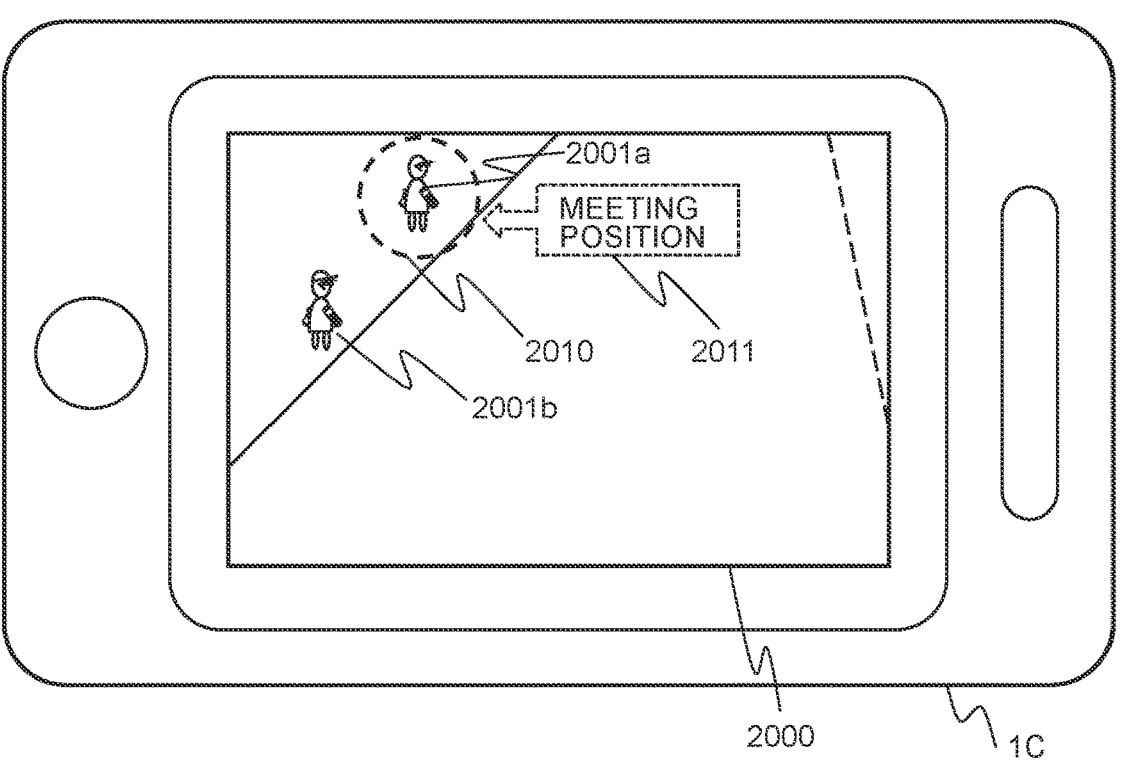
FIG. 26A is a display example of an opposition information terminal image of the information terminal 1C in Example 8.
Figure 26B:
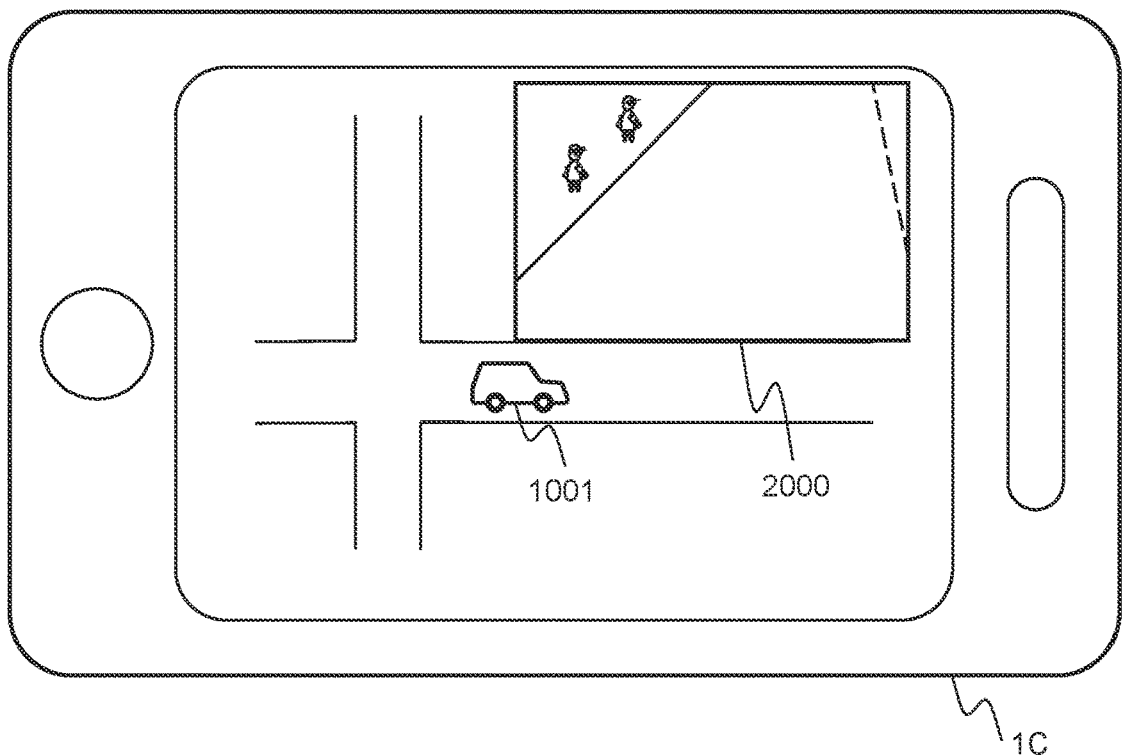
FIG. 26B is a display example in which the opposition information terminal image is displayed to be superimposed on a map display screen of the information terminal 1C in Example 8.

The detailed procedure will be described. First, as illustrated in FIG. 26A, the information terminal 1C displays an opposition information terminal image 2000. Note that, as illustrated in FIG. 26B, the opposition information terminal image may be displayed to be superimposed on a map display screen in Example 7. In this example, a person 2001*a* who is the user carrying the information terminal 1C when seen from the information terminal 1A, and a person 2001*b* who is different from the user are shown in the opposition information terminal image 2000. The information terminal 1C receives user input for specifying the person in the image, who is the user, or the meeting position. The user input for specifying the person or the meeting position, for example, is input for designating a position on the display screen by touching with the finger of the user and specifying the person or the meeting position in accordance with the designated position. Note that, an input method by a touch operation is an example, and the input method is not limited to the touch operation insofar as the method is capable of specifying the person or the position. The same applies to the following input method for specifying the person or the position. In addition, the position at which the person exists may be specified as the meeting position by input for specifying the person, or the person at the position may be specified by input for specifying the meeting position. Alternatively, the information terminal 1C may specify the person 2001*a* who is the user by image analysis, regardless of the input of the user for specifying the person. In the image analysis, the information terminal 1C may use the image of the user that is captured by the information terminal 1C at the meeting point in personal identification.

After specifying a meeting target person (that is, the user oneself) or a meeting position, the information terminal 1C displays a specific mark 2010 of the person or a specific mark 2011 of the meeting position to be superimposed on the opposition information terminal image 2000. The information terminal 1C may display both of the marks. After the person or the meeting position is specified, the information terminal 1C transmits position information of the specified target in the opposition information terminal image 2000 to the opposition information terminal 1A. The opposition information terminal 1A recognizes the meeting target person and the meeting position by the position information in the image acquired from the information terminal 1C.

Figure 27:
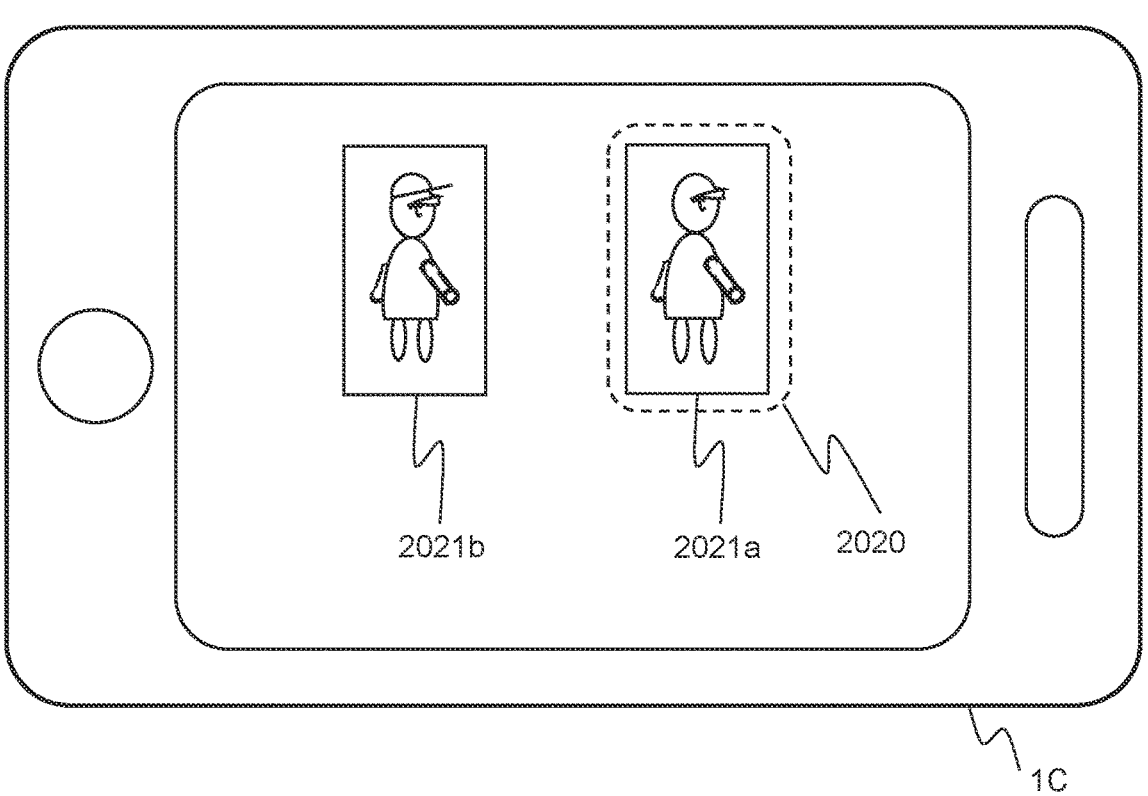
FIG. 27 is a diagram illustrating a modification example of a method for specifying a person in Example 8.

As a modification example of the method for specifying the person, a method as illustrated in FIG. 27 may be provided. That is, the information terminal 1C displays an image (2021a and 2021b) of a person part extracted from the opposition information terminal image, and receives the input operation of the user for specifying the person. In such an example, the image 2021a is a person image corresponding to the user, and the information terminal 1C receives the operation of the user for specifying the image 2021a, and then, for example, displays a specific mark 2020 indicating that the image is specified. The information terminal 1C receives the operation of the user for specifying the person image, and then, notifies the result of specifying the person image to the opposition information terminal 1A. The opposition information terminal 1A recognizes who is the meeting opposition, on the basis of the result of specifying the person image that is notified from the information terminal 1C. Note that, the image (2021a and 2021b) may be extracted by the opposition information terminal 1A, may be extracted by the information terminal 1C, and may be extracted by the server 2.

Next, a method for the user carrying the information terminal 1C to check a recognition result of the meeting target person and the meeting position according to the opposition information terminal 1A will be described.

Figure 28:
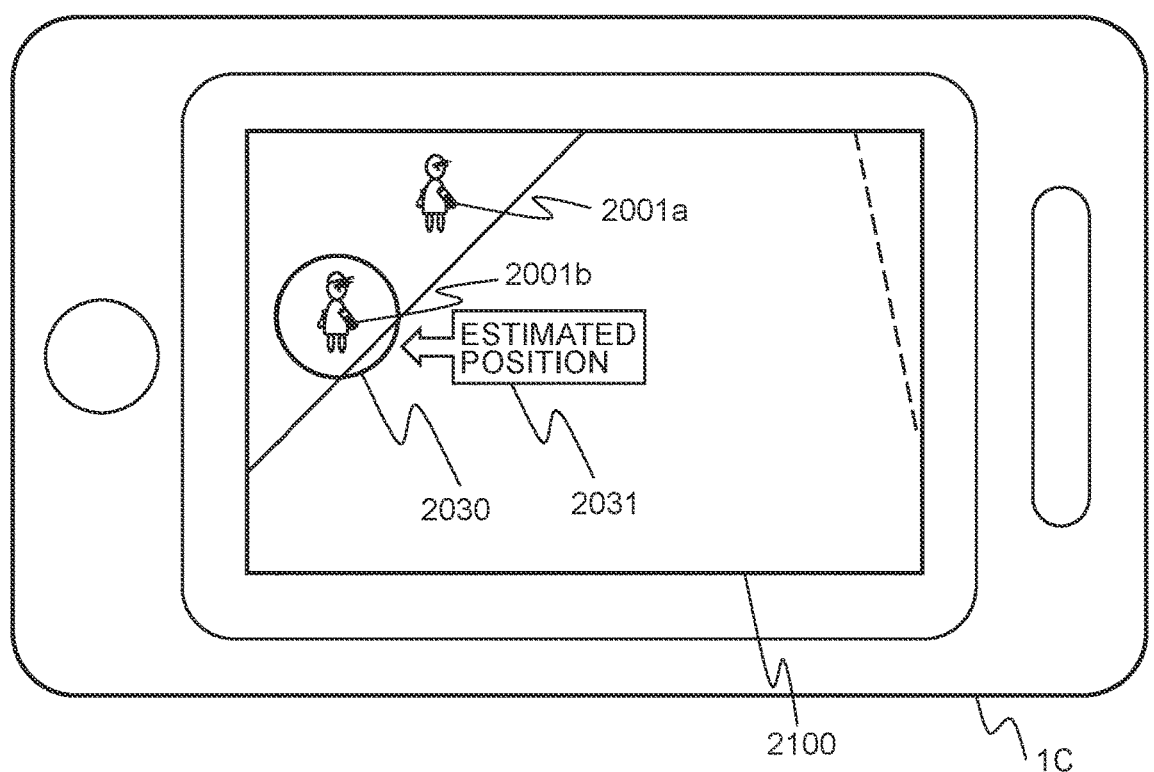
FIG. 28 is a display example of a recognition result of the opposition information terminal 1A of the information terminal 1C in Example 8.

The opposition information terminal 1A recognizes the meeting target person and the meeting position by the position estimation according to the reception intensity of the wireless signal of the direct communication or the position information acquired from the information terminal 1C. The information terminal 1C acquires information of the recognition result according to the opposition information terminal 1A, and displays the recognition result as illustrated in FIG. 28. In the display example of FIG. 28, the information terminal 1C displays a specific mark 2030 indicating the meeting target person and a specific mark 2031 indicating the meeting position recognized by the opposition information terminal to be superimposed on an opposition information terminal image 2100. The mark may be superimposed by the information terminal 1C, or the opposition information terminal image 2100 may be acquired as an image on which the mark is superimposed by the information terminal 1A.

The user of the information terminal 1C is capable of determining the suitability of the recognition result by looking at the specific mark 2030 of the meeting target person and the specific mark 2031 of the meeting position recognized by the opposition information terminal 1A. The information terminal 1C presents the opposition information terminal image 2100 to the user, and then, receives correction input of the user.

In a case where correction is required, the user performs the correction input. In the correction input, as with the case of FIG. 26A, the own position of the user or the meeting position in the image is input by means such as touch. FIG. 28 is an example of a case in which the meeting target is the person 2001a, but the opposition information terminal 1A erroneously recognizes the person 2001b as the meeting target. The information terminal 1C receives the correction input that the meeting target is the person 2001a (that is, the user oneself) from the user, and then, notifies correction information to the opposition information terminal 1A. The information terminal 1A corrects the meeting target person and the meeting position, in accordance with the correction information notified from the information terminal 1C.

Figure 29:
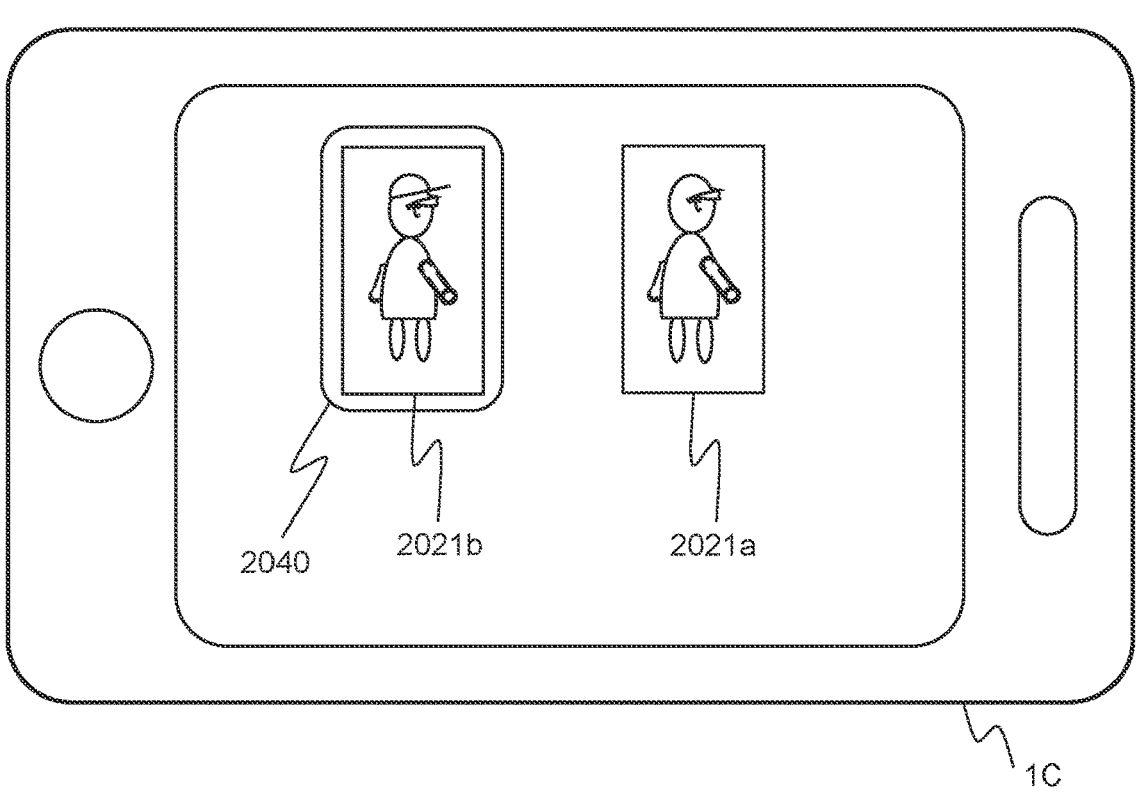
FIG. 29 is a display format in which a person image for correcting a meeting target person is listed in Example 8.

The meeting target person may be corrected by a display format in which the person image is listed as illustrated in FIG. 29. In list display of the person images, display for finding the person image that is recognized by the opposition information terminal 1A as the meeting target person may be performed by a method for displaying a specific mark 2040 to be superimposed such that the user of the information terminal 1C is capable of determining the suitability of the recognition result. In the case of the correction, as with FIG. 27, the information terminal 1C receives the input of the correct person image.

Figure 30:
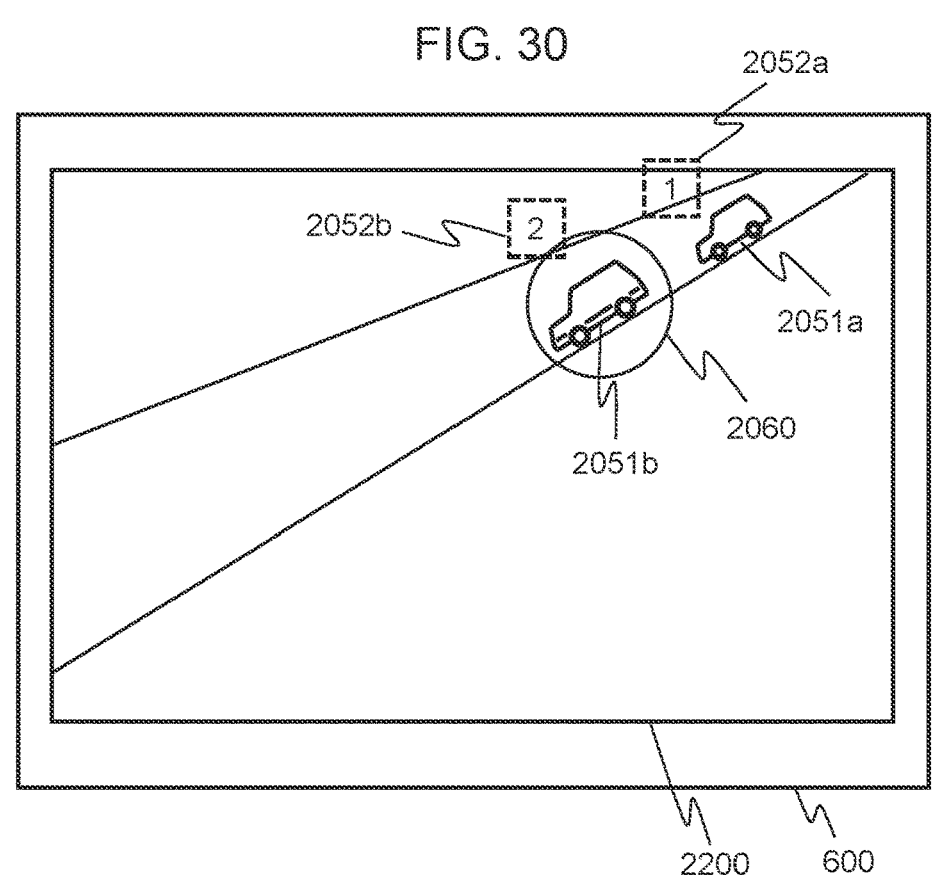
FIG. 30 is a display screen of the information terminal 1A in Example 8.

Note that, the type of information terminal is not limited to those exemplified. For example, the information terminal on the taxi side may be the own information terminal 1A, a HMD of the customer may be the opposition information terminal 1B, and the suitability of the recognition of the customer information terminal 1B for a meeting target car may be determined on the information terminal 1A side. A display example in the information terminal 1A is illustrated in FIG. 30. The information terminal 1A displays an opposition information terminal image 2200, and in the image, a car 2051a and a car 2051b are shown. In addition, the information terminal 1B also displays a specific mark 2060 indicating that the car is recognized as the meeting target car to be superimposed. The car corresponding to the information terminal 1A is 2051a, but in this example, a state is illustrated in which the information terminal 1B erroneously recognizes the different car 2051b as the meeting target car. In the correction of the erroneous recognition of the meeting target car, as described above, the information terminal 1A performs correction determination by means such as the own image analysis of the information terminal, or receives the correction input of the user. Note that, since there is a case where the user of the information terminal 1A is driving a car, the correction input of the user may be performed by producing the sound of an identification symbol (2052a and 2052b) for identifying the car additionally displayed to be superimposed by the information terminal 1A, but not by the operation such as touch. Since other embodiments are basically the same as described above, the details thereof will be omitted.

Figure 31:
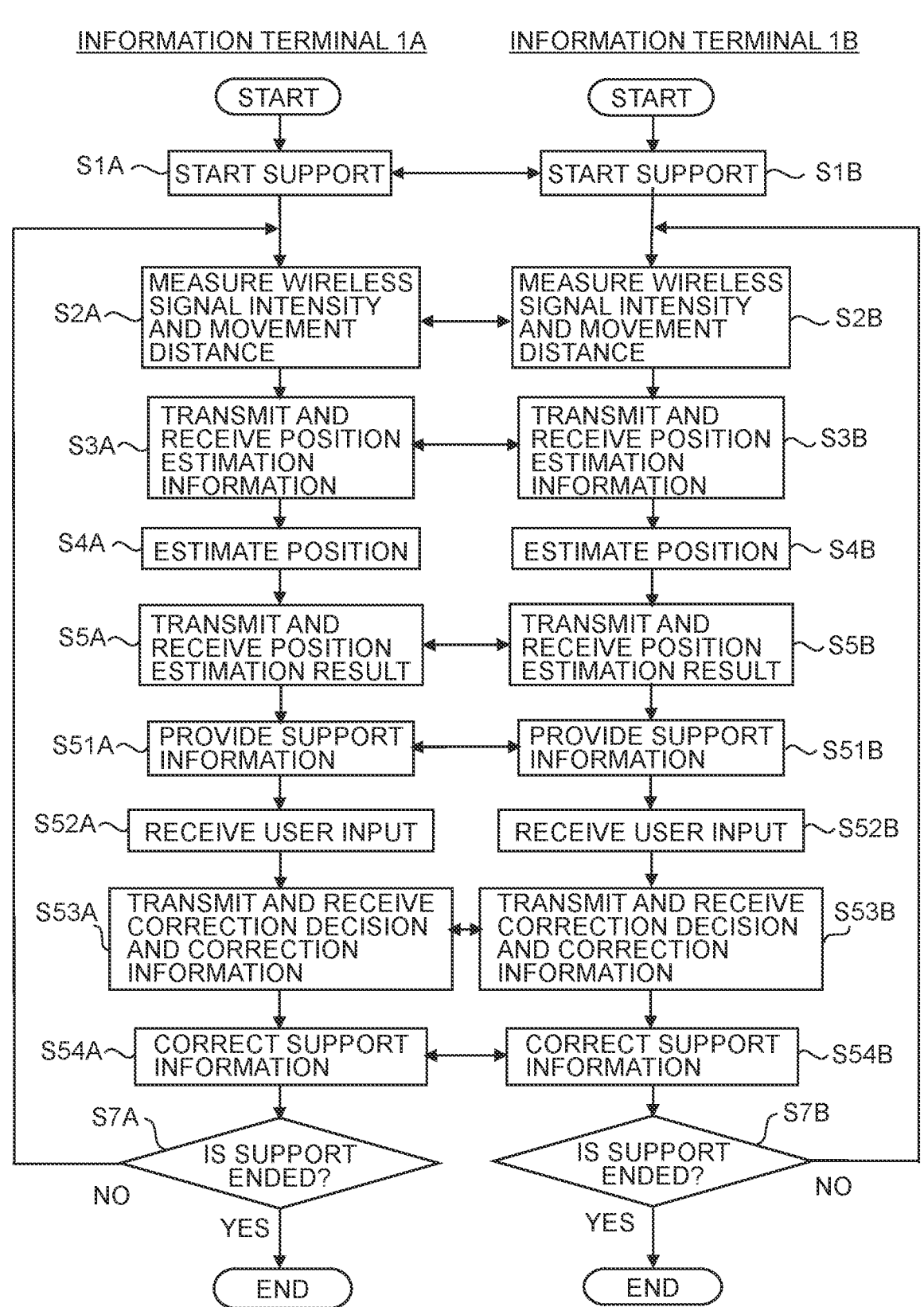
FIG. 31 is a control flowchart of the meeting support in Example 8.

FIG. 31 is a control flowchart of the meeting support in this example. FIG. 31 is based on the flowchart in FIG. 9, processing from steps S51A and S51B to steps S54A and S54B is different, and thus, the processing will be described. Since other steps are the same processing as that in FIG. 9, the description thereof will be omitted.

In steps S51A and S51B, each of the information terminals 1 provides information for supporting the meeting to the user or the control device of the car. In addition to the display of support information on the own information terminal, the support information that is displayed on the own information terminal is transmitted to the opposition information terminal.

In steps S52A and S52B, in a case where the correction information of the meeting target car, the meeting target person, or the like is input by the user, the input is received.

In steps S53A and S53B, in a case where there is the correction information input by the user, and the correction information determined by the information terminal, the information is transmitted to the opposition information terminal.

In steps S54A and S53B, in a case where there is the correction information, the support information is corrected.

As described above, it is possible for the opposition information terminal to check the recognition of the own information terminal position and to notify the own information terminal position to the opposition information terminal by acquiring the opposition information terminal image, and it is possible to attain more accurate meeting support.

Example 9

In this example, a modification example will be described in which the information terminal 1 is more easily specified in an image.

In Examples described above, in a case where the information terminal 1 determines the meeting target person or the meeting target car in the image, the determination input of the user is received, or the determination according to the image analysis is used. In this example, instead of such a method, the information terminal 1 specifies the person or the car by the identification information that is transmitted by a light emitting device 3000 as a light signal.

Figure 32:
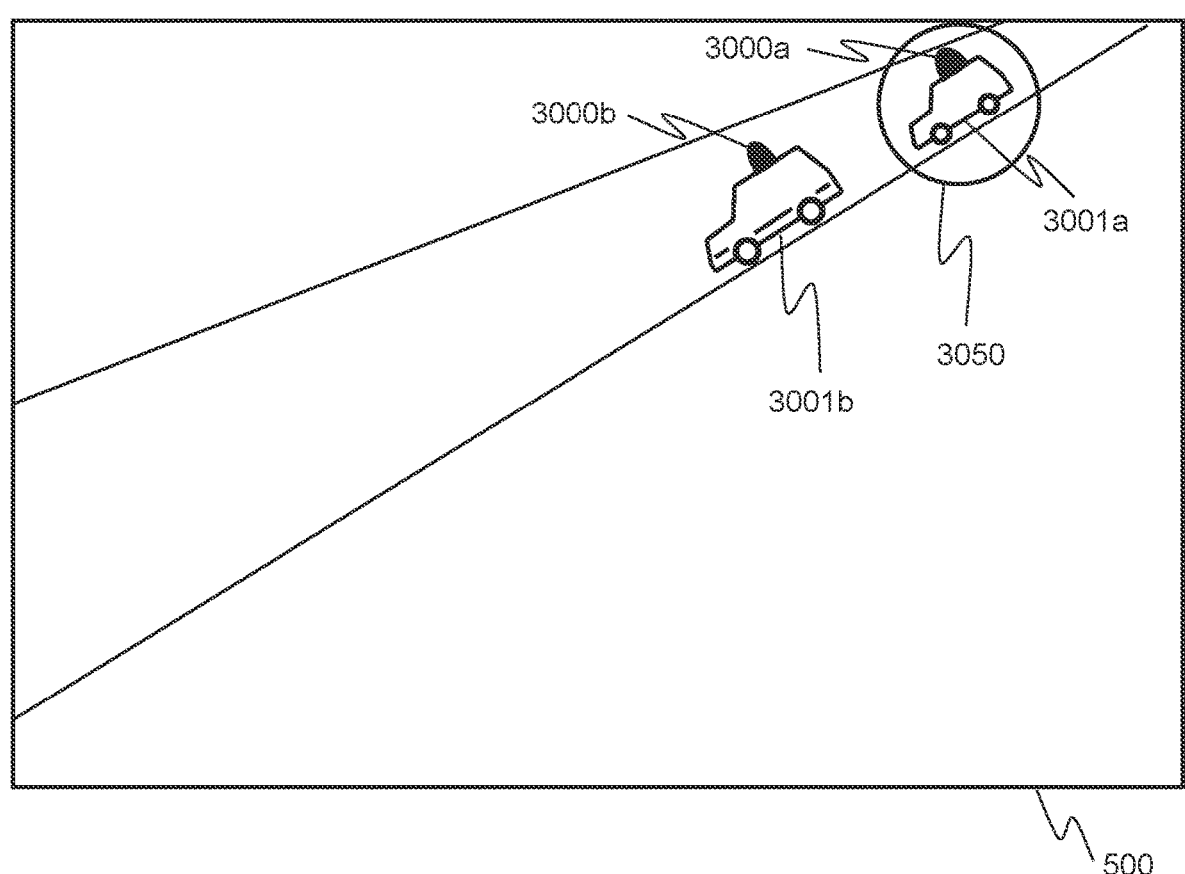
FIG. 32 is a display screen of the information terminal 1B in Example 9.

FIG. 32 illustrates the display screen 500 of the information terminal 1B that is the HMD in this example. In the case of a transmissive HMD, the user is capable of directly looking at the external state. In the case of a video see-through HMD, the user is capable of looking at the external state as a video image. Even in the case of the transmissive HMD, the external state is captured with a camera.

FIG. 32 illustrates a condition in which the user is directed toward a direction in which it is estimated that there is the meeting target car from the reception intensity of the wireless signal of the direct communication. In this example, two cars (3001a and 3001b) to be a candidate exist within the visual field of the user. In the cars, light emitting devices 3000a and 3000b are installed in the car body, respectively. In the case of the information terminal 1A, when the information terminal 1A is mounted on the car, the light emitting device 3000 is separately installed at a position seen from the outside. In such a condition, the information terminal 1A transmits the own identification information by the light emitting device 3000 as the light signal. The identification information may be the same as the identification information of the wireless signal of the direct communication, but the information terminal 1A is notified in advance to the opposition information terminal 1B. Alternatively, the information terminal 1B may designate the identification information.

Figure 33:
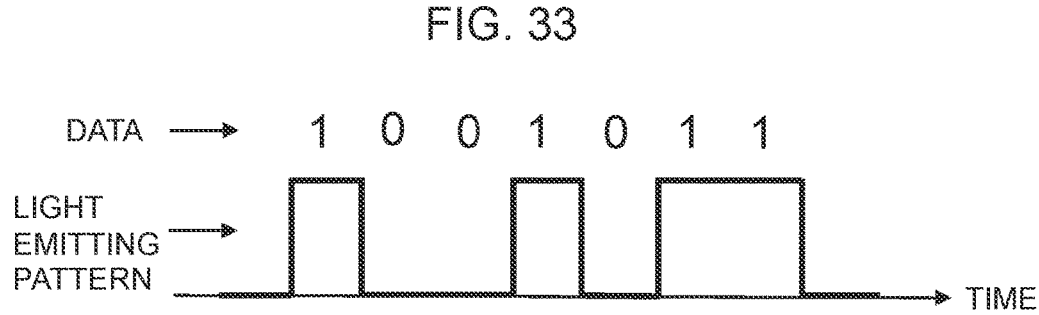
FIG. 33 is an explanatory diagram of transmission information of a light signal of a light emitting device in Example 9.

The transmission of the identification information according to the light signal using the light emitting device 3000, for example, is performed by modulating a light emitting intensity, as illustrated in FIG. 33. In FIG. 33, communication according to a bit sequence is illustrated in which a case where light is emitted corresponds to "1", and a case where light is not emitted corresponds to "0", but the present invention is not limited thereto. For example, multiple-valued modulation may be performed. A modulation rate of the light emitting intensity is set to be slower than a frame rate of the camera on an imaging side such that the modulation of the light emitting intensity is reliably captured with a camera. For example, when the frame rate of the camera is 60 frames/second, the modulation rate is approximately 20 baud.

In the information terminal 1B, a moving image is captured with the camera, and the region of the light emitting devices 3000a and 3000b is extracted by the image analysis. Then, the information terminal 1B restores the information transmitted from each of the cars (3001a and 3001b) from a change in the brightness of the region. Then, the information terminal 1B specifies whether the notification is received in advance or which is the meeting target car by checking against the identification information of the information terminal 1A that is a meeting target designated by the information terminal 1B oneself. In FIG. 33, the meeting target car is 3001a, and the information terminal 1B displays a specific mark 3050 of an AR object indicating that the car 3001a is the meeting target car to be superimposed. Here, in a case where there is a target that transmits the same identification information as the identification information of the information terminal 1 that is the meeting target, coincidentally, the information terminal 1B may request the information terminal 1A to change the identification information to be transmitted.

Note that, the identification information may be transmitted by both of the information terminals 1, and the opposition information terminal 1 may be checked by both of the information terminals. In addition, the combination of the types of information terminals 1 is not limited to the above. Then, the information terminal 1 that transmits the information from the light emitting device 3000 as the light signal may receive the image of the opposition information terminal 1, and may check transmission information of the own light emitting device 3000. Further, the server 2 may restore the information that is transmitted from the light emitting device 3000 in the image, and the server 2 may notify the information terminal 1 which person, which car, or which information terminal 1 is the meeting target in the image.

The method of this example may be combined in other examples as means for specifying which person, which car, or which information terminal 1 is the meeting target.

Figure 34:
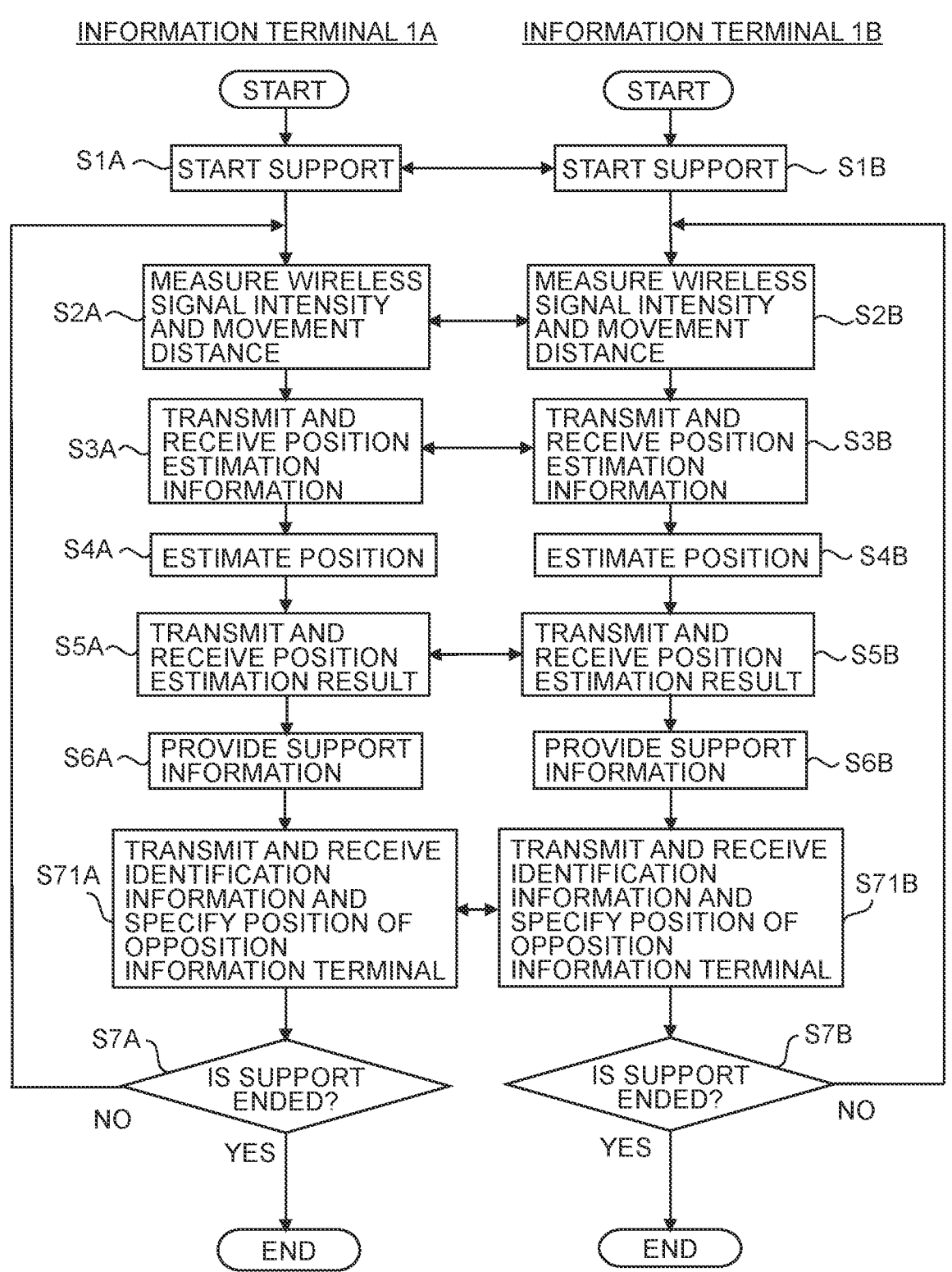
FIG. 34 is a control flowchart of the meeting support in Example 9.

FIG. 34 is a control flowchart of the meeting support in this example. On the basis of the flowchart in FIG. 9, the processing described above is performed as steps S71A and S71B. Since other steps are the same processing as that in FIG. 9, the description thereof will be omitted.

In steps S71A and S71B, one information terminal 1 transmits the own identification information to the opposition information terminal 1 by using the light emitting device 3000. The information terminal 1 that receives the transmission of the identification information captures a moving image in a direction in which it is assumed that there is the information terminal 1 on a transmission side. Here, both of the information terminals 1 may be the transmission side of the identification information. The moving image is analyzed by the information terminal 1 on a reception side of the identification information, the information terminal 1 on the transmission side, or the server 2, and the information terminal 1 on the transmission side in the image is specified.

As described above, it is possible to specify the accurate position of the opposition information terminal 1 from the transmission of the identification information using the light emitting device according to the information terminal 1, and the analysis of the moving image obtained by capturing the information terminal 1 that transmits the identification information, and it is possible to improve the reliability of the meeting support system.

Examples have been described, but Examples have been described in detail to make the present invention understandable, and are not necessarily limited to having all the configurations described above. In addition, a part of the configuration of one Example can be replaced with the configuration of other Examples, and the configuration of other Examples can also be added to the configuration of one Example. In addition, the addition, the deletion, and the replacement of other configurations can be performed with respect to a part of the configuration of each Example. In addition, a part or all of the functions and the like described above may be implemented by hardware, or may be implemented by software program processing. The program or the data configuring the functions and the like may be stored in a computer-readable storage medium, or may be stored in a device on a communication network.

REFERENCE SIGNS LIST 1, 1A to 1D Information terminal
2 Server
3 Meeting spot
4 Building
5 Predetermined range
6 Length of wall
9 Communication network
10 Housing
11 Display surface
101 Processor
102 Memory
103 Display device
107 Manipulation input unit
110A, 110B Movement line
111 Earth surface
112A, 112B Origination
113, 115A, 115B Distance
114A, 114B Movement distance
120 Direct wave path
130A, 130B Projection line
500, 600 Display screen
501, 503, 505, 601, 603, 605, 1005 Explanation message
502, 504, 602, 604 Mark of AR object
1000, 1001, 1010, 1200, 1210 Mark
1007 Input box
1100 Vibration generator
2000, 2100, 2200 Opposition information terminal image
2001a, 2001b Person
2010, 2011, 2020, 2030, 2031, 2040, 2060, 3050 Specific mark
2021a, 2021b Image
2051a, 2051b, 3001a, 3001b Car
2052a, 2052b Identification symbol
3000, 3000a, 3000b Light emitting device

The invention claimed is:

1. A system comprising:
a device including a transmitter configured to transmit a wireless signal associated with identification information;
a server; and
an information terminal including:
    a first transceiver configured to receive position information of the device via the server;
    a second transceiver configured to receive the wireless signal associated with the identification information from the device without communication via the server;
    a display;
    at least one processor; and
    at least one memory storing instructions that, when executed by the at least one processor, cause the information terminal to:

display a first mark on a map displayed on the display based on the position information of the device received by the first transceiver via the server, the first mark indicating a position corresponding to the device;
    when movement of either the information terminal or the device enables the information terminal to receive the wireless signal from the device by the second transceiver without communication via the server, measure signal intensity of the wireless signal received by the second transceiver without communication via the server;
    estimate a relative positional relationship between the information terminal and the device based on the measured signal intensity of the wireless signal; and
    display a second mark, different from the first mark, corresponding to the device on the display, wherein a form of the second mark is varied according to the signal intensity of the wireless signal received by the second transceiver.

2. The system according to claim 1, wherein the instructions, when further movement of either the device or the information terminal disables the information terminal to directly receive the wireless signal from the device by the second transceiver after displaying the second mark, cause the display to display the first mark instead of the second mark.

3. The system according to claim 1, wherein the instructions cause the display to display information regarding the relative positional relationship between the information terminal and the device based on the measured signal intensity of the wireless signal.

4. The system according to claim 3, wherein the instructions cause the display to display information regarding a distance between the information terminal and the device as the information regarding the relative positional relationship between the information terminal and the device.

5. The system according to claim 3, wherein the instructions cause the display to display an arrow image indicating a direction of a position of the device as the information regarding the relative positional relationship between the information terminal and the device.

6. The system according to claim 1, wherein the instructions cause the display to display a message indicating the relative positional relationship between the information terminal and the device as the information regarding the relative positional relationship between the information terminal and the device.

7. The system according to claim 1, wherein the instructions, when further movement of either the information terminal or the device results in a reduced distance between the information terminal and the device after displaying the second mark, cause the display to display information that is different from the second mark instead of the second mark.

8. The system according to claim 1, further comprising a camera, wherein the instructions, when receiving an user operation, cause the display to display an image acquired by the camera instead of the second mark.

9. The system according to claim 8, wherein the instructions, when the image acquired by the camera includes the device, cause the display to display a mark of AR object superimposed on the image.

10. The system according to claim 8, wherein the instructions cause the display to display the second mark on the map display on the display.

11. An information terminal comprising:

a first transceiver configured to receive position information of an external device via a communication network;

a second transceiver configured to directly receive a wireless signal associated with identification information from the external device;

a display;

at least one processor, and at least one memory storing instructions that, when executed by the at least one processor, cause the information terminal to:

display a first mark on a map displayed on the display based on the position information of the external device received by the first transceiver via the communication network, the first mark indicating a position corresponding to the external device;

when movement of either the information terminal or the external device enables the information terminal to directly receive the wireless signal from the external device by the second transceiver, measure signal intensity of the wireless signal received by the second transceiver;

estimate a relative positional relationship between the information terminal and the external device based on the measured signal intensity of the wireless signal; and display a second mark, different from the first mark, corresponding to the external device on the display, wherein a form of the second mark is varied according to the signal intensity of the wireless signal received by the second transceiver.

12. The information terminal according to the claim 11, wherein the instructions, when further movement of either the information terminal or the external device disables the information terminal to directly receive the wireless signal from the external device by the second transceiver after displaying the second mark, cause the display to display the first mark instead of the second mark.

13. The information terminal according to the claim 11, wherein the instructions cause the display to display information regarding the relative positional relationship between the information terminal and the external device based on the measured signal intensity of the wireless signal.

14. The information terminal according to the claim 13, wherein the instructions cause the display to display information regarding distance between the information terminal and the external device as information regarding the relative positional relationship.

15. The information terminal according to the claim 13, wherein the instructions cause the display to display an arrow image indicating direction of position of the external device as information regarding the relative positional relationship.

16. The information terminal according to the claim 13, wherein the instructions cause the display to display a message indicating the relative positional relationship as information regarding the relative positional relationship.

17. The information terminal according to the claim 11, wherein the instructions, when further movement of either the information terminal or the external device results in a reduced distance between the information terminal and the external device after displaying the second mark, cause the display to display information that is different form the second mark instead of the second mark.

18. The information terminal according to the claim 11, further comprising a camera, wherein the instructions, when receiving an user operation, cause the display to display an image acquired by the camera instead of the second mark.

19. The information terminal according to the claim 18, wherein the instructions, when the image acquired by the camera includes the external device, cause the display to display a mark of AR object superimposed on the image.

20. The information terminal according to the claim 18, wherein the instructions cause the display to display the second mark on the map displayed on the display.

\* \* \* \* \*